(12) United States Patent
Hallenstål

(10) Patent No.: US 12,052,659 B2
(45) Date of Patent: Jul. 30, 2024

(54) NETWORK NODES AND METHODS PERFORMED THEREIN FOR HANDLING NETWORK FUNCTIONS

(71) Applicant: Telefonaktiebolaget LM Ericsson (publ), Stockholm (SE)

(72) Inventor: Magnus Hallenstål, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 295 days.

(21) Appl. No.: 17/595,979

(22) PCT Filed: Jun. 10, 2019

(86) PCT No.: PCT/SE2019/050531
§ 371 (c)(1),
(2) Date: Nov. 30, 2021

(87) PCT Pub. No.: WO2020/251425
PCT Pub. Date: Dec. 17, 2020

(65) Prior Publication Data
US 2022/0240172 A1   Jul. 28, 2022

(51) Int. Cl.
*H04W 48/18* (2009.01)
*H04L 41/122* (2022.01)
(Continued)

(52) U.S. Cl.
CPC .......... *H04W 48/18* (2013.01); *H04L 41/122* (2022.05); *H04W 8/26* (2013.01); *H04W 12/03* (2021.01); *H04W 48/16* (2013.01)

(58) Field of Classification Search
CPC ....... H04W 48/18; H04W 12/03; H04W 8/26; H04W 48/16; H04L 41/122
See application file for complete search history.

(56) References Cited

U.S. PATENT DOCUMENTS

| 2010/0246509 A1 | 9/2010 | Chen |
| 2011/0274049 A1 | 11/2011 | Hallenstal et al. |

(Continued)

FOREIGN PATENT DOCUMENTS

| CN | 106416329 A | 2/2017 |
| CN | 109792598 A | 5/2019 |

(Continued)

OTHER PUBLICATIONS

International Search Report and Written Opinion for Application No. PCT/SE2019/050531, dated Mar. 11, 2020, 17 pages.

(Continued)

*Primary Examiner* — Duc C Ho
(74) *Attorney, Agent, or Firm* — Nicholson De Vos Webster & Elliott LLP

(57) ABSTRACT

A method performed by a first network node in a communications network, for handling Network Function (NF) service requests over a roaming interface. The first network node is arranged in a service producer domain of the communications network. The first network node obtains, from a second network node located in a service consumer domain of the communications network, a discovery request for a service located in the service producer domain of the communications network. The first network node retrieves an address of a NF service producer node providing the requested service, wherein the NF service producer node is located in the service producer domain of the communications network. The first network node generates a first Uniform Resource Identifier (URI) by appending an address of the first network node to the address of the NF service producer node. The first network node provides, to the second network node, the first URI.

25 Claims, 11 Drawing Sheets

(51) Int. Cl.
*H04W 8/26* (2009.01)
*H04W 12/03* (2021.01)
*H04W 48/16* (2009.01)

(56) References Cited

U.S. PATENT DOCUMENTS

| | | | |
|---|---|---|---|
| 2017/0094499 | A1 | 3/2017 | Nenner et al. |
| 2020/0007632 | A1* | 1/2020 | Landais .................. H04L 67/02 |
| 2022/0353797 | A1 | 11/2022 | Baek et al. |
| 2023/0268982 | A1* | 8/2023 | Li ...................... H04B 7/15507 370/315 |

FOREIGN PATENT DOCUMENTS

| | | |
|---|---|---|
| WO | 2007125498 A1 | 11/2007 |
| WO | 2016091279 A1 | 6/2016 |

OTHER PUBLICATIONS

Huawei, "Informative Annex on End to End Call Flow via SEPP," Apr. 8-12, 2019, 13 pages, 3GPP TSG-CT WG4 Meeting #90, C4-191415, Xi'an, P.R. China.

3GPP TS 23.003 V15.6.0, "3rd Generation Partnership Project; Technical Specification Group Core Network and Terminals; Numbering, addressing and identification (Release 15)," Dec. 2018, 130 pages, 3GPP Organizational Partners.

3GPP TS 23.501 V16.0.2, "3rd Generation Partnership Project; Technical Specification Group Services and System Aspects; System Architecture for the 5G System; Stage 2 (Release 16)," Apr. 2019, 317 pages, 3GPP Organizational Partners.

3GPP TS 23.527 V15.2.0, "3rd Generation Partnership Project; Technical Specification Group Core Network and Terminals; 5G System; Restoration Procedures (Release 15)," Mar. 2019, 19 pages, 3GPP Organizational Partners.

3GPP TS 29.500 V15.2.1, "3rd Generation Partnership Project; Technical Specification Group Core Network and Terminals; 5G System; Technical Realization of Service Based Architecture; Stage 3 (Release 15)," Dec. 2018, 32 pages, 3GPP Organizational Partners.

3GPP TS 29.501 V15.2.0, "3rd Generation Partnership Project; Technical Specification Group Core Network and Terminals; 5G System; Principles and Guidelines for Services Definition; Stage 3 (Release 15)," Dec. 2018, 66 pages, 3GPP Organizational Partners.

3GPP TS 29.510 V15.2.0, "3rd Generation Partnership Project; Technical Specification Group Core Network and Terminals; 5G System; Network Function Repository Services; Stage 3 (Release 15)," Dec. 2018, 107 pages, 3GPP Organizational Partners.

3GPP TS 33.501 V15.3.1, "3rd Generation Partnership Project; Technical Specification Group Services and System Aspects; Security architecture and procedures for 5G system (Release 15)," Dec. 2018, 181 pages, 3GPP Organizational Partners.

A. Gulbrandsen et al., "A DNS RR for specifying the location of services (DNS SRV)," Feb. 2000, 12 pages, RFC 2782, The Internet Society.

Huawei, "Informative Annex on End to End Call Flow via SEPP", 3GPP TSG-CT WG4 Meeting #90, C4-191016, Apr. 2019, 13 pages.

International Preliminary Report on Patentability, PCT App. No. PCT/SE2019/050531, Dec. 23, 2021, 14 pages.

M. Belshe et al., "Hypertext Transfer Protocol Version 2 (HTTP/2)," May 2015, 96 pages, RFC 7540.

Office Action, CN App. No. 201980097357.7, Nov. 28, 2023, 41 pages (21 pages of English Translation and 20 pages of Original Document).

* cited by examiner

NETWORK NODES AND METHODS PERFORMED THEREIN FOR HANDLING NETWORK FUNCTIONS

CROSS-REFERENCE TO RELATED APPLICATIONS

This application is a National stage of International Application No. PCT/SE2019/050531, filed Jun. 10, 2019, which is hereby incorporated by reference.

TECHNICAL FIELD

Embodiments herein relate to a network nodes and methods therein for handling 'Network Function (NF) discovery and service requests in a communications network. More specifically the embodiments herein relate to handling service request from a NF service consumer, such as e.g. a User Equipment (UE), located in a visited network, towards a NF located in a home network of the NF service consumer. Furthermore, a computer program and a computer readable storage medium configured to perform the method are also provided herein.

BACKGROUND

In a typical wireless communication network, wireless devices, also known as wireless communication devices, mobile stations, stations (STA) and/or User Equipment (UE), communicate via a Local Area Network such as a WiFi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a W-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipment. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core network nodes and in some cases even to different core networks, e.g. in RAN sharing deployments.

The 3GPP has defined an IP Multimedia Subsystem (IMS) as a communication service provider network for both 4G LTE and 5G NR.

For the 5G system (as described in 3GPP TS23.501) a 5G package core network has been defined where the network functions interact with each other in a service-based approach:

Network Functions, such as e.g. Access Management Function (AMF), within the control plane enable other authorized network functions to access their services.

NFs use service Network Repository function to perform a service registration and de-registration of itself for addressing;

NFs use the NF discovery service to find registered NFs and their provided services;

The discovery service is provided by a Network Function Repository Function (NRF) as follows:

The NRF supports a service discovery service. The NRF may receive an NF Discovery Request from an NF instance, and provides the information of the discovered NF instances (to be discovered) to the requesting NF instance.

The NRF maintains a NF profile of available NF instances and their supported services. The NF profile is what NFs provide in NF service registration.

When two NFs shall interconnect over a roaming interface, e.g. when a UE is located in a visited Public Land Mobile Network (vPLMN) and request a service from a NF in a home Public Land Mobile Network (hPLMN), two gateway nodes, which may also be referred to as Security Edge Protection Proxys, SEPPs, are inserted in a communication path between the two functions. The communication path may comprise a plurality of network interconnection points. In order to enable Transport Layer Security (TLS), so called telescopic Fully Qualified Domain Names (FQDNs) are used, see e.g. 3GPP TS 33.501 clause 13.1 and the format of the telescopic FQDN in 3GPP TS 23.003 clause 28.5.2. In principle, the TLS is terminated in each network interconnect point, and the signaling will therefore have a hop by hop pattern.

When a service consumer, such as e.g. a UE, in a vPLMN wants to access a service located in the hPLMN, the service consumer sends a discovery request to a visited Network Repository Function (vNRF) in the vPLMN. The vNRF sees that this request is for roaming, and sends the discovery request to a consumer Security Edge Protection Proxy (cSEPP) which is the SEPP located in the vPLMN. The cSEPP sends a message to a producer SEPP (pSEPP) located in the hPLMN of the service consumer and the pSEPP forwards the discovery request to a home Network Repository Function (hNRF) in the hPLMN. The hNRF then answers with one or several NF profiles of the NFs that matches the discovery query. This answer is sent to the pSEPP, which may do topology hiding by altering the FQDNs of the NF profile(s). In case of topology hiding, the pSEPP requires a mapping table between the altered FQDN ($FQDN_{pSEPP}$) and the actual FQDN ($FQDN_{NFservice}$) of the NF service(s).

The pSEPP sends the NF profile, comprising the $FQDN_{pSEPP}$, to the cSEPP which in turn alters the FQDNs by format "label.$FQDN_{pSEPP}$". The cSEPP creates a mapping table between the label(s) and the $FQDN_{pSEPP}$.

As can be seen the cSEPP need to not only have transactional state but also session state where label vs producer FQDN is needed.

In the existing solutions, the SEPP need to have a mapping between the different FQDNs. Since this is not performed on a transaction level it means that the SEPP need to store a mapping table. The mapping tables need to be stored in a redundant fashion, since it is for a longer period of time.

Building redundancy for data is costly, and should therefore be avoided if possible. Also, it is not known for how long a label might live, thus the SEPP does not know when it can purge data in the mapping table.

SUMMARY

An object of embodiments herein is to provide a method for handling service requests over a roaming interface, which simplifies the implementation of gateway nodes, such as SEPPs, and improves data handling of the gateway nodes.

According to a first aspect of embodiments herein, the object is achieved by a method performed by a first network node in a communications network, for handling NF service requests over a roaming interface. The first network node is arranged in a service producer domain of the communications network. The first network node obtains, from a second network node located in a service consumer domain of the communications network, a discovery request for a service located in the service producer domain of the communications network. The first network node retrieves an address of a NF service producer node providing the requested service. The NF service producer node is located in the service producer domain of the communications network. The first network node generates a first Uniform Resource Identifier (URI) path by appending an address of the first network node to the address of the NF service producer node: The first network node further provides the first URI path to the second network node.

According to a second aspect of embodiments herein, the object is achieved by a method performed by the second network node in a communications network, for handling NF service requests over a roaming interface. The second network node is arranged in the service consumer domain of the communications network. The second network node obtains a discovery request from an NF service consuming device for a service located in a service provider domain of the communications network. The second network node sends the request for the service to a first network node located in a producer domain of the communications network. The second network node receives, from the first network node, a response to the request comprising an address representing an NF service producer node. The second network node generates a third URI path by appending the address of the second network node as a string to the address representing the NF service producer node. The second network node provides the response to the request, comprising the third URI path, to the NF service consuming device. The third URI path represents the path to the NF service producer node from the NF service consuming device.

According to a third aspect of embodiments herein, the object is achieved by a first network node in a communications network, for handling NF service requests over a roaming interface. The first network node is arranged in a service producer domain of the communications network. The first network node is configured to obtain, from a second network node located in a service consumer domain of the communications network, a discovery request for a service located in the service producer domain of the communications network. The first network node is configured to retrieve an address of a NF service producer node providing the requested service, wherein the NF service producer node is located in the service producer domain of the communications network. The first network node is configured to generate a first URI path by appending an address of the first network node to the address of the NF service producer node. The first network node is further configured to provide the first URI path to the second network node.

According to a fourth aspect of embodiments herein, the object is achieved by a second network node in a communications network, for handling NF service requests over a roaming interface. The second network node is arranged in a service consumer domain of the communications network. The second network node is configured to obtain a discovery request from a NF service consuming device, for a service located in a service provider domain of the communications network. The second network node is configured to send the request for the service to a first network node located in a producer domain of the communications network. The second network node is configured to receive, from the first network node, a response to the request comprising an address representing an NF service producer node. The second network node is configured to generate a third URI path by appending the address of the second network node as a string to the address representing the NF service producer node. The second network node is further configured to provide, to the NF service consuming device, the response to the request comprising the third URI path, wherein the third URI path represents the path to the NF service producer node from the NF service consuming device.

It is furthermore provided herein a computer program comprising instructions, which, when executed on at least one processor, cause the at least one processor to carry out any of the methods above, as performed by the NF service provider. It is additionally provided herein a computer-readable storage medium, having stored thereon a computer program comprising instructions which, when executed on at least one processor, cause the at least one processor to carry out the method according to any of the methods above, as performed by the first network node.

It is furthermore provided herein a computer program comprising instructions, which, when executed on at least one processor, cause the at least one processor to carry out any of the methods above, as performed by the NF service consumer. It is additionally provided herein a computer-readable storage medium, having stored thereon a computer program comprising instructions which, when executed on at least one processor, cause the at least one processor to carry out the method according to any of the methods above, as performed by the second network node.

The advantage of the embodiments herein is that the first and second network nodes, such as the SEPPs, do not need to have to store dynamic mapping tables. This has the benefit that the first and second network nodes do not need to know when data in the mapping table can be purged, and that there is no need to implement redundant data storage for the mapping tables, which reduces the cost and effort for data handling.

BRIEF DESCRIPTION OF THE DRAWINGS

Embodiments will now be described in more detail in relation to the enclosed drawings, in which.

DETAILED DESCRIPTION

The embodiments described herein provide an improved method for handling NF request, such as discovery requests and service requests from a NF service consumer located in a vPLM N for a NF located in an hPLMN of the NF service consumer.

Figure 1:
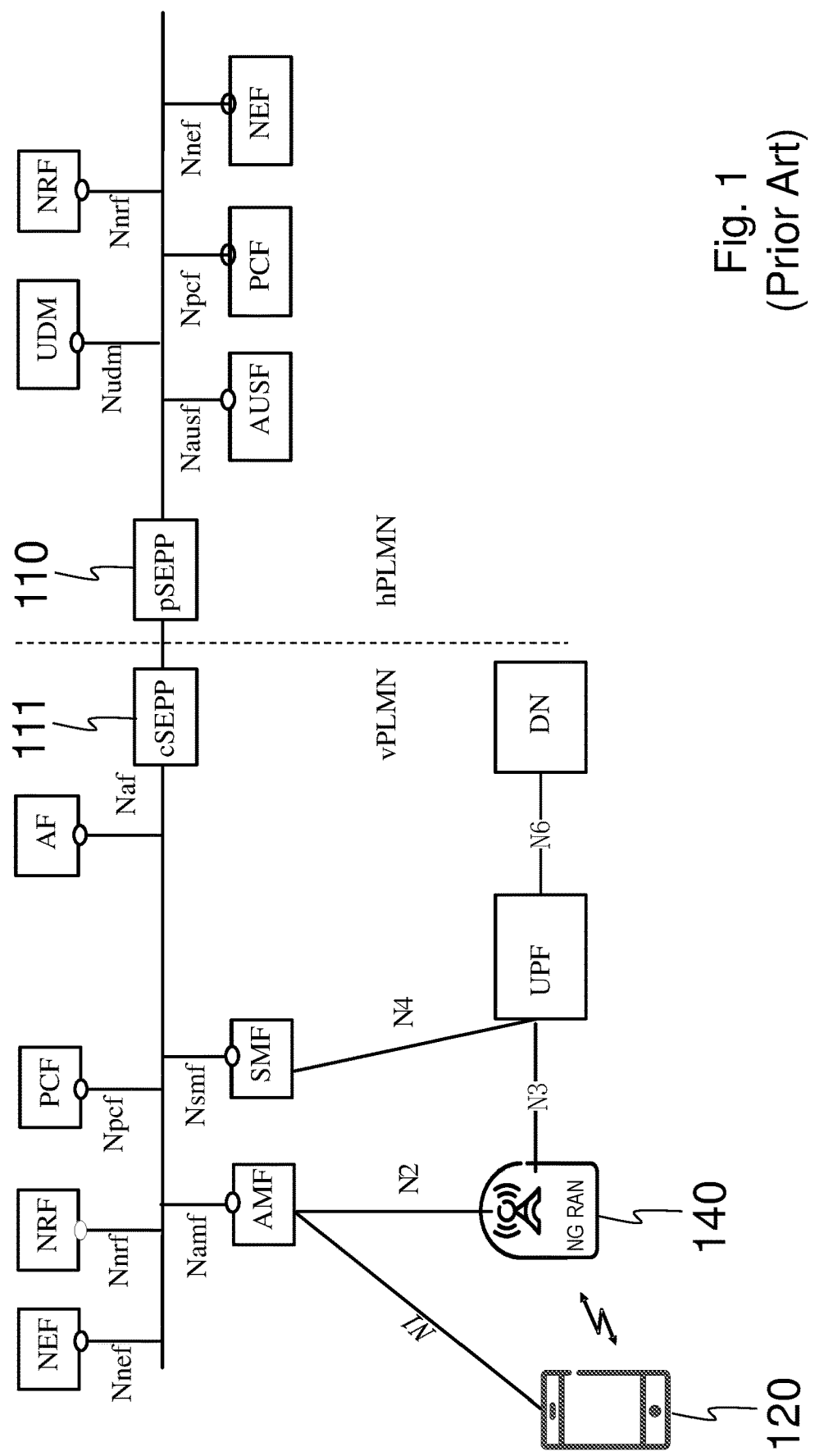
FIG. 1 is a schematic overview depicting a communication network according to prior art.

Embodiments herein relate to a communication network in general. FIG. 1 is a schematic overview depicting a communication network 100. The communication network 100 comprises a Radio Access Network (RAN) and a Core Network (CN). The communication network 100 may use a number of different technologies, such as Wi-Fi, Long Term Evolution (LTE), LTE-Advanced, 5G, 2G/3G, CDMA, UTRAN, GERAN, Wideband Code Division Multiple Access (VVCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in both a 5G, 4G, 3G and 2G context. Earlier technologies using CS domains are herein also referred to as legacy communication networks, legacy core networks or legacy RAN depending on the specific part of the network that it refers to.

In the communication network 100, wireless devices e.g. a User Equipment (UE) 110 such as a mobile station, a non-access point (non-AP) STA, a STA, a wireless device and/or a wireless terminal, communicate via an Access Network (AN), e.g. a RAN, with the CN. It should be understood by those skilled in the art that an UE is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a base station communicating within a cell.

The communication network 100 comprises a set of radio network nodes, such as radio network nodes 140 each providing radio coverage over one or more geographical areas of a radio access technology (RAT), such as 5G New Radio (NR), LTE, UMTS, GSM, Wi-Fi or similar. The radio network node 140, 160 may be a radio access network node such as a radio network controller or an access point such as a wireless local area network (WLAN) access point or an Access Point Station (AP STA), an access controller, a base station, e.g. a radio base station such as a NodeB, an evolved Node B (eNB, eNodeB), a 5G nodeB (gNB), a base transceiver station, Access Point Base Station, base station router, a transmission arrangement of a radio base station, a stand-alone access point or any other network unit capable of serving a wireless device within the cell, which may also be referred to as a service area, served by the radio network node 140, 160 depending e.g. on the first radio access technology and terminology used. The radio network node 140 is comprised in the radio access network (RAN).

The communications network may comprise one or more Public Land Mobile Networks (PLMNs). The PLMNs may be run by different operators and when a subscribed user uses his operator's PLMN then this PLMN may be referred to as a Home-PLMN (hPLMN). Roaming however allows users to move outside their home network and to use resources from other operator's network. Such a network operated by a different operator than the subscribed operator may be referred to as a Visited-PLMN (vPLMN).

The CN shown herein is based on a service based system architecture. Wherever suitable the architecture elements are defined as network functions that offer their services via interfaces of a common framework to any network functions that are permitted to make use of these provided services. One or more Network Repository Functions (NRF) allow each network function to discover the services offered by other network functions. This architecture model, which further adopts principles like modularity, reusability and self-containment of network functions, enable deployments to take advantage of the latest virtualization and software technologies. The related service based architecture figures depict those service based principles by showing the network functions, primarily Core Network functions, with a single interconnect to the rest of the system to enable inter-PLMN interconnection across various NFs.

In FIG. 1 a roaming scenario with local breakout is shown, wherein the roaming UE interfaces the Data Network (DN) in the visited network (vPLMN) and the home network (hPLMN) enables it with subscription information via e.g. a Unified Data Management (UDM), subscriber authentication via an Authentication Server Function (AUSF) and UE specific policies via a Policy Control Function (PCF). Network slice selection via a Network Slice Selection Function (NSSF), network access control and mobility management via an Access and Mobility Management Function (AMF), data service management via a Service Management Function (SMF) and application functions (AF) are provided by the vPLMN. A User Plane Function (UPF) manages the user plane. A first network node 110 and a second network node 111, such as the SEPPs, act as gateway nodes and protect the interactions between the PLMNs.

In the local breakout scenarios the UE receives the services of a PLMN mainly from the serving operator's administrative domain. However home-routed data services may also be used for roaming scenarios, which have also network functions from the home operator's administrative domain involved and the UE interfaces the DN in the hPLMN.

The SEPPs in this known solution require a mapping between the altered FQDNs and the original FQDNs. The SEPPs thus need to store mapping table in a redundant fashion, since they may be used by the NF service consumer 120 for service requests over a longer period of time. It is also not known how long a label might be alive. Building redundant near real time data storage is costly. The logic to be designed for when the SEPP can purge data from the mapping table is very complex.

In order to overcome said problems, the embodiments herein provide a solution for handling NF service requests in which address information of the NF service producer is calculated, appended and/or withdrawn from the NF profile instead of using the mapping tables. The addresses of the service instances may be comprised in the NF profile, e.g. within an apiPrefix of a URI representing the service instance. The apiPrefix is an optional path string of the URI that may be used to uniquely identify the NF service instance. The solution according to the embodiments herein for handling discovery and/or service requests is to append the address information in the apiPrefix of the URI. For example, when the hNRF in the hPLMN forwards a response to the discovery request to the NF service consumer via the gateway nodes, such as the first and the second network node 110, 111, one or more of the gateway nodes may append the real FQDN of the previous interconnection point, such as a previous network node in the path, to the apiPrefix:es of each respective service instance. The URI generic syntax consists of a hierarchical sequence of five components:
URI=scheme:[//authority]path[?query][ #fragment]
wherein the authority component divides into three subcomponents:
authority=[userinfo@]host[:port]

In the following the term URI string is the string of the full URI without the URI scheme.

The first network node 110 located in the hPLMN, such as the pSEPP, may encrypt the service address of the NF service producer node 130 in order to enable topology hiding. The first network node 110 may append the encrypted address, such as the FQDN, to the apiPrefix. The encryption may e.g. be done using a symmetric crypto, thereby the information in the apiPrefix will not be readable and have no meaning to the network nodes and/or network functions in the vPLMN.

The second network node 111 which is located in the vPLMN, such as the cSEPP, transforms the format of the service address, such as the FQDN, by adding a label to the address of the second network node, such as label.FQDNcSEPP. However, according to the embodiments disclosed herein the second network node 111, such as the cSEPP, may use a generic label for all producer service addresses, such as FQDNs. In the example shown herein, the second network node 111 appends the FQDNs received in the NF profile to the apiPrefix of each service.

Hence, for a service x, the NF profile may be amended according to the following when the message travels via the network interconnection points, such as the first and the second network nodes 110, 111, on the path towards the NF service consumer node 120. The original service address of the NF service producer node 130 may be:

NF profile:
FQDN=servicex-1.op.org
apiPrefix=""
...

After passing the first network node 110, such as the pSEPP, in which the FQDN of the NF service producer node 130 is encrypted and appended to the apiPrefix of the NF profile:

NF profile:
FQDN=sepp1.op1.org
apiPrefix="/5d2cc0b86cef8bb08f805c37c33ed860fe80a3f2d1d0f3b7"
...

After the message has passed the second network node 111, such as the cSEPP, in which the FQDN of the first network node 110 has been appended to the apiPrefix of the NF profile and the generic label has been appended to the FQDN of the second network node 111:

NF profile:
FQDN=label.sepp2.op2.org
apiPrefix="/sepp1.op1.org/5d2cc0b86cef8bb08f805c37c33ed860fe80a3f2d1d0f3b7"
...

In a similar fashion callback URIs may be constructed, wherein the path part of the URI of the actual or the encrypted FQDN for the NF service producer node 130 may be appended.

The operations of the first and second network nodes 110, 111, such as the cSEPP and pSEPP, may be orthogonal, i.e. the cSEPP may not require that the pSEPP does topology hiding, or how it does it, and the pSEPP may not care in which way cSEPP handles labels. In other words, any one of the first and the second network nodes 110, 111 may operate according to the legacy solution while the other of the first and the second network node may operate according to the embodiments herein.

The method actions performed by the first network node 110 in the communications network for handling NF service requests over a roaming interface according to embodiments herein will now be described with reference to a flowchart depicted in FIG. 2. The first network node 110 is arranged in a service producer domain of the communications network 100. In the embodiments disclosed herein the service producer domain may be an hPLMN of the NF service consuming device 120, such as a UE. The actions do not have to be taken in the order stated below, but may be taken in any suitable order. Actions performed in some embodiments only are marked with dashed boxes.

Action 2010: The first network node 110 obtains a discovery request for a service located in the service producer domain of the communications network, from the second network node 111 located in a service consumer domain of the communications network 100. This action 2010 corresponds to action 403 as described in relation to FIG. 4 herein.

Action 2020: The first network node 110 retrieves an address of a NF service producer node 130 providing the requested service. The NF service producer node 130 is located in the service producer domain of the communications network 100. The address of the NF service producer node 130 may e.g. be a Fully Qualified Domain Name, FQDN, an Internet Protocol, IP, v4 address or an IP v6 address. In some embodiments the first network node 110 may retrieve addresses of a plurality of NF service producer nodes 130, which may provide the requested service. The addresses of the plurality of NF service producers may e.g. be retrieved by sending the request to the hNRF which may find one or more NF service producers 130 matching the discovery query. The hNRF may e.g. find a NF service producer 130 matching the discovery request by checking the NFs that have been registered with the hNRF.

Figure 4:
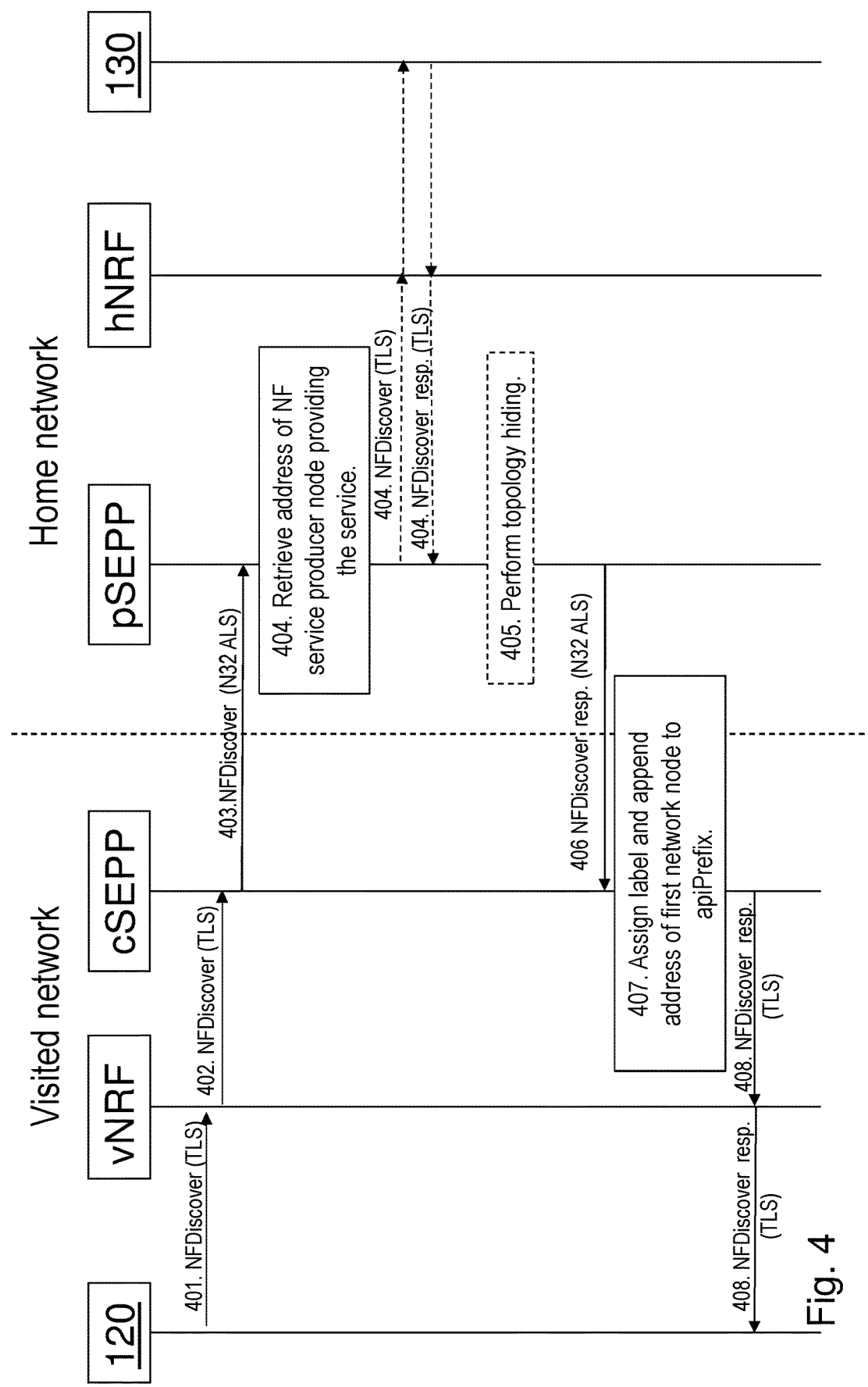
FIG. 4 is a signaling diagram depicting the method for handling discovery requests according to embodiments herein.

This action 2020 corresponds to action 404 as described in relation to FIG. 4 herein.

Action 2030: In some embodiments the first network node 110 may encrypt the retrieved address of the NF service producer node 130. This action 2030 is similar to action 405 as described in relation to FIG. 4 herein.

Action 2040: The first network node 110 generates a first Uniform Resource Identifier, URI, by appending an address of the first network node 110 to the address of the NF service producer node 130. The address of the first network node 110 may be appended as a string in front of the address to the NF service producer node 130. In other words, the address of the first network node 110 may be added to the authority part of the first URI, while the address of the NF service producer node 130 is placed in the path part of the first URI.

The address of the NF service producer node 130 may be comprised in an API prefix comprised in the URI path of the first URI.

The first URI may be comprised in a NF profile related to the NF service producer node 130.

The first URI may in some embodiments be comprised in a location parameter in a HTTP message.

This action 2040 is similar to action 405 as described in relation to FIG. 4 herein.

Action 2050: The first network node 110 provides the first URI, to the second network node 111. The first URI may be provided in a response to the discovery request message. The response may also be referred to as a discovery response message.

This action 2050 is similar to the action 406 described in relation to FIG. 4.

Action 2060: Once a NF service producer node 130 for providing the service has been identified the first network node 110 may further obtain, from the second network node 111, a request for the service. The request for the service may comprise the first URI.

Figure 5:
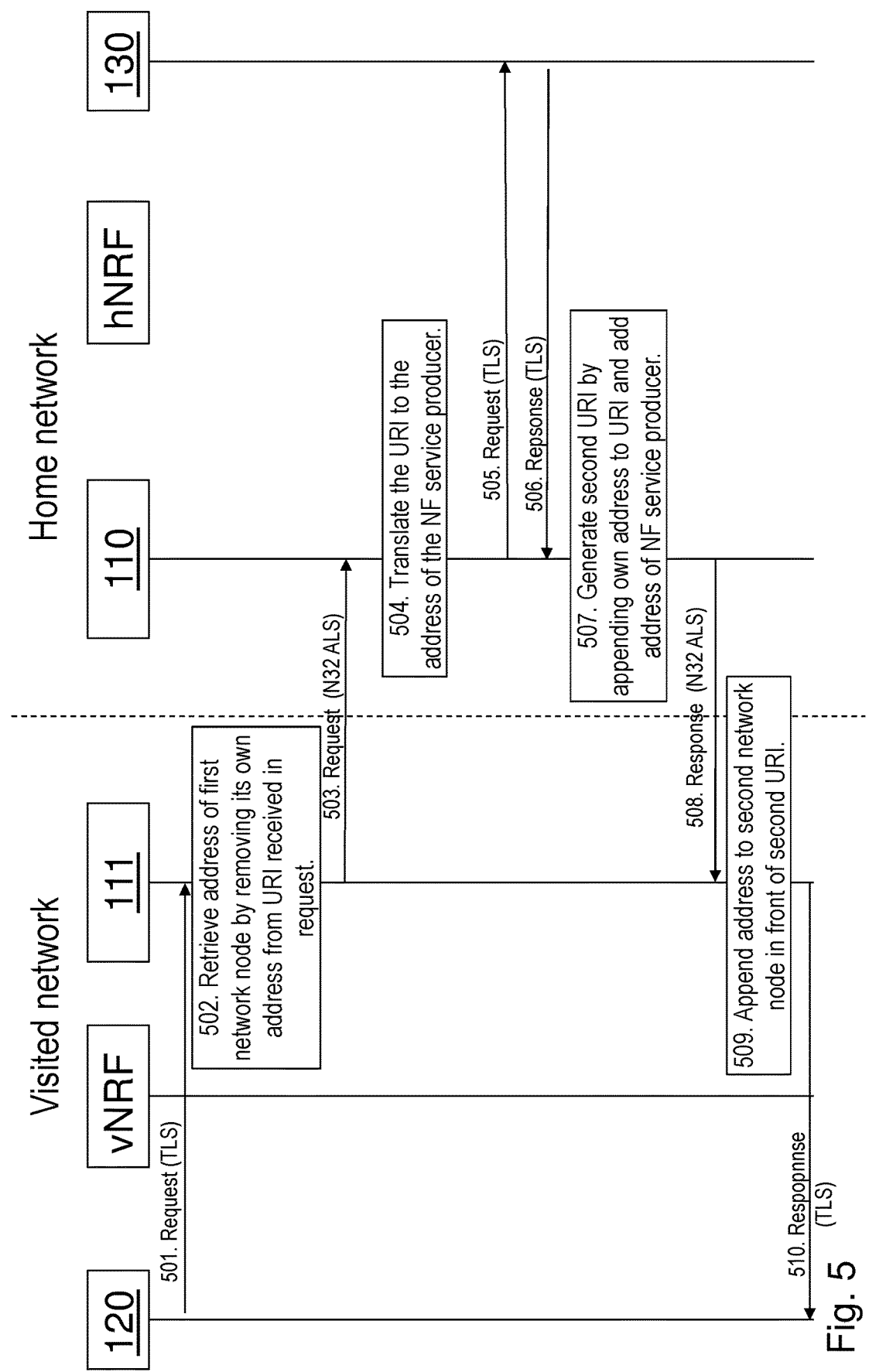
FIG. 5 is a signaling diagram depicting the method for handling service requests according to embodiments herein.

This action 2060 is similar to the action 503 described in relation to FIG. 5.

Action 2070: The first network node 110 may retrieve, from the first URI comprised in the obtained request for the service, the address to the NF service producer node 130 providing the requested service. The address of the NF service producer node 130 may e.g. be retrieved by removing its own address from the first URI, such that only the address of the NF service producer node 130 remains in the URI. In other words, the address of the first network node 110 may be removed from the authority part of the first URI, such that the address of the NF service producer node 130 constitutes the authority part of the URI.

This action 2070 is similar to the action 504 described in relation to FIG. 5.

Action 2080: In case the address of the NF service producer node 130 was encrypted in action 5030, the first network node 110 may decrypt the retrieved address of the NF service producer node 130 prior to sending the request to the NF service producer node 130. This may be done in order to identify the actual address of the NF service producer node 130 to which the request for the service shall be forwarded. The first URI may further be amended by replacing the encrypted address with the decrypted address.

This action 2080 is similar to the action 504 described in relation to FIG. 5.

Action 2090: The first network node 110 may send the request for the service to the NF service producer node 130 indicated by the retrieved address. The request for service may comprise the amended URI having the unencrypted/decrypted address of the NF service producer node (130) in the authority part of the URI.

This action 2090 is similar to the action 505 described in relation to FIG. 5.

Action 2100: The first network node 110 may receive, from the NF service producer node, a response to the request for the service, wherein the response comprises an address of a resource created in the NF service producer node in response to the request for the service.

This action 2090 is similar to the action 506 described in relation to FIG. 5.

Action 2110: The first network node 110 may encrypt the address of the resource created in the NF service producer node 130.

Figure 2A:
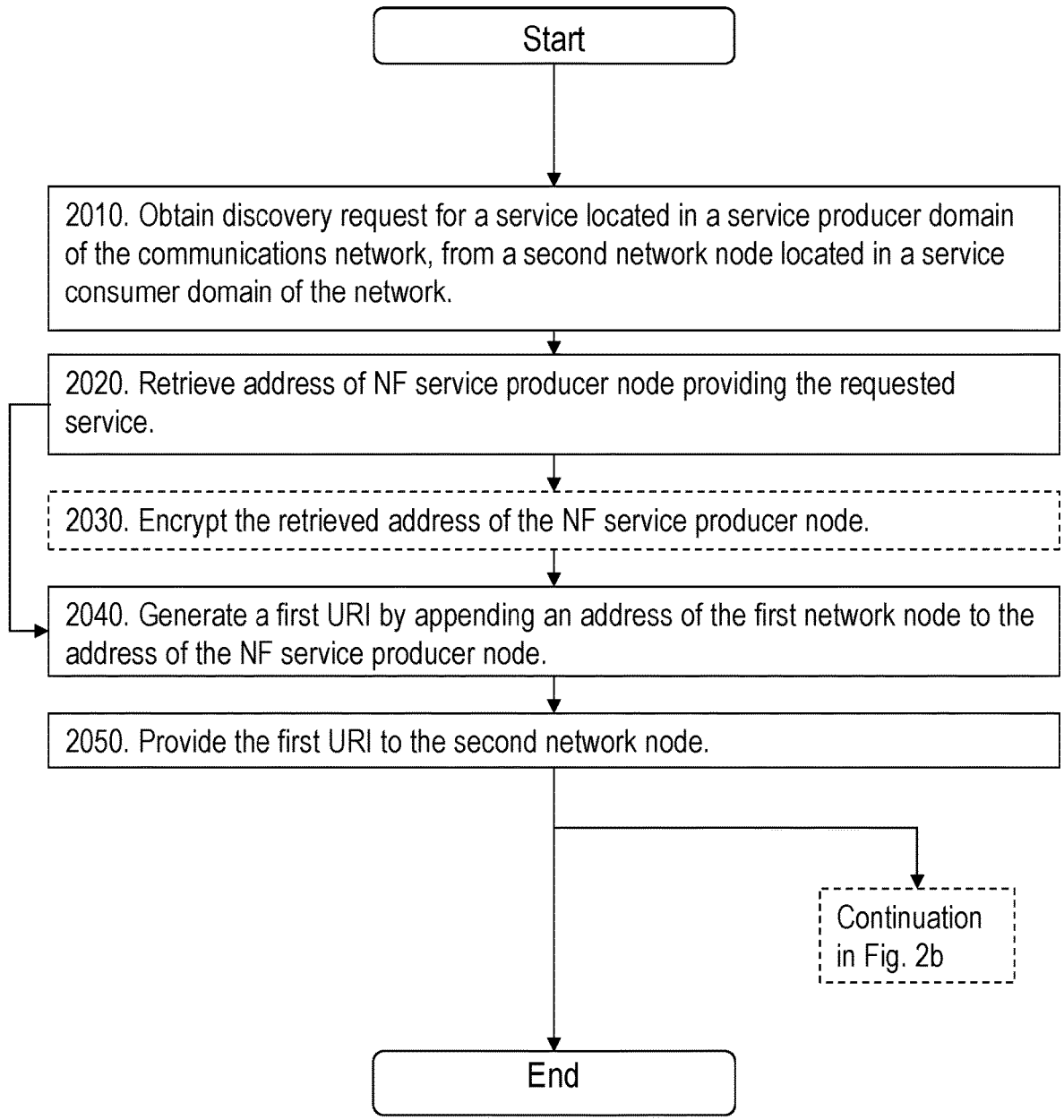
FIG. 2a is a flowchart depicting a method for handling discovery requests performed by a first network node according to embodiments herein.
Figure 2B:
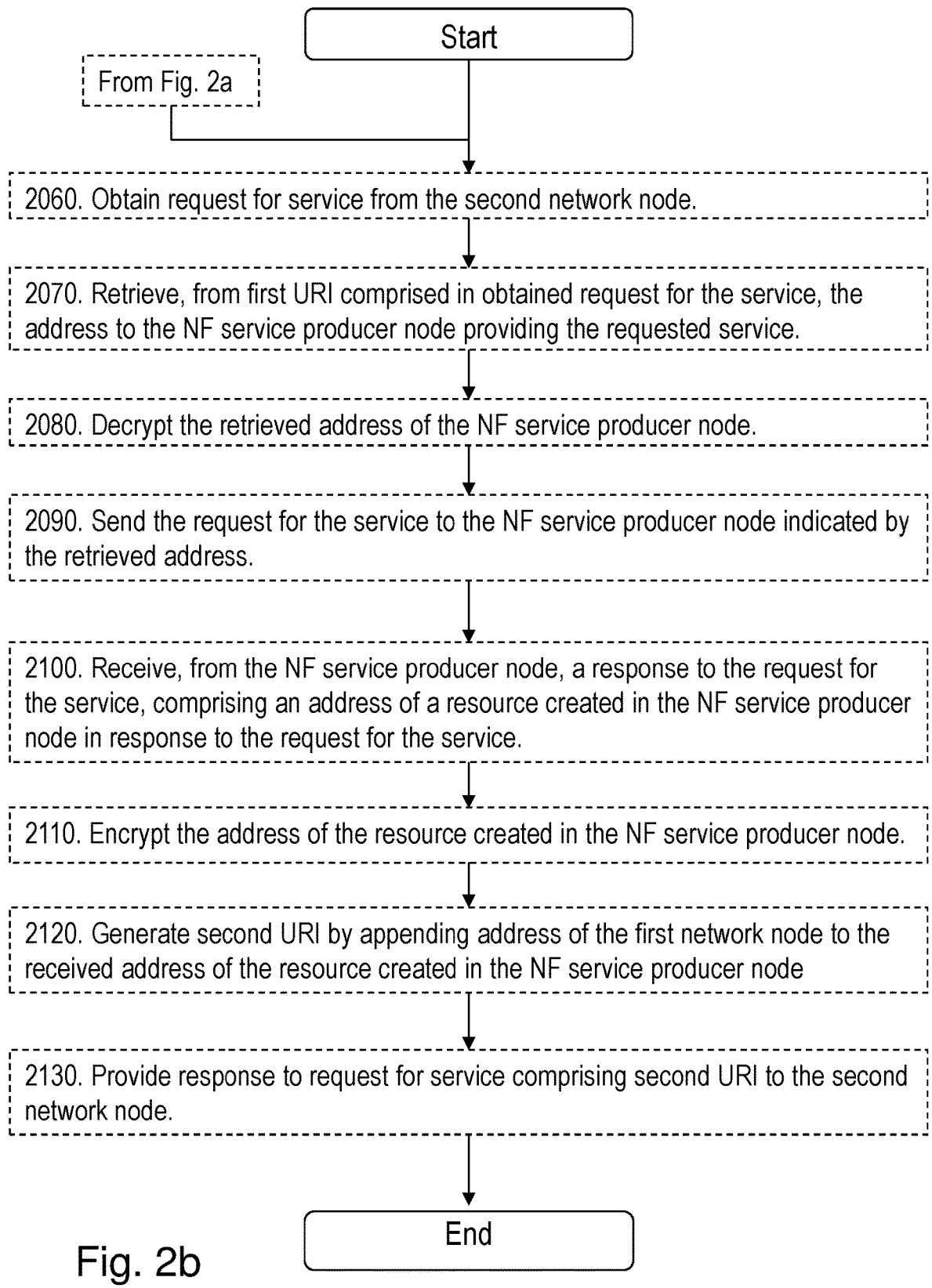
FIG. 2b is a flowchart depicting a method for handling service requests performed by the first network node according to embodiments herein.

This action 2110 is similar to the action 5 described in relation to FIG. 2.

Action 2120: The first network node 110 may generate a second URI path by appending the address of the first network node 110 to the received address of the resource created in the NF service producer node 130. The address may e.g. be appended in encrypted or unencrypted form. In other words, the address of the first network node 110 may be added to the authority part of the second URI, while the address of the NF service producer node 130 is placed in the path part of the second URI.

The address of the NF service producer node 130 may be comprised in an API prefix comprised in the URI path of the second URI.

The second URI may be comprised in the NF profile related to the NF service producer node 130.

In some embodiments the second URI may be comprised in a location parameter in a HTTP message.

This action 2120 is similar to the action 507 described in relation to FIG. 5.

Action 2130: The first network node 110 may provide the response to the request for service to the second network node 111, wherein the response comprises the second URI.

This action 2130 is similar to the action 508 described in relation to FIG. 5.

The method actions performed by the second network node 111 in the communications network 100, for handling NF service requests over a roaming interface, according to embodiments herein will now be described with reference to a flowchart depicted in FIG. 3. The second network node 111 is arranged in a service consumer domain of the communications network 100. The actions do not have to be taken in the order stated below, but may be taken in any suitable order. Actions performed in some embodiments only are marked with dashed boxes.

Action 3010: The second network node 111 obtains a discovery request from a NF service consuming device 120 for a service located in a service provider domain of the communications network 100.

This action 3010 is similar to the action 401 described in relation to FIG. 4.

Action 3020: The second network node 111 sends the discovery request for the service to the first network node 110 located in a producer domain of the communications network 100.

This action 3020 is similar to action 403 described in relation to FIG. 4.

Action 3030: The second network node 111 receives, from the first network node 110, a response to the request comprising an address representing the NF service producer node 130, such as one or more, NF service producer node 130.

The address representing the NF service producer node 130 may be comprised in a first URI further comprising the address of the first network node 110.

The address representing the NF service producer node 130 may also be comprised in an API prefix comprised in the first URI further comprising the address of the first network node 110.

The address representing the NF service producer node 130 may be provided as a FQDN, an IP v4 address or an IP v6 address.

The address of the NF service producer node 130 may be comprised in an API prefix comprised in the URI path of the first URI.

The first URI may be comprised in a location parameter in a HTTP message.

This action 3030 is similar to action 406 described in relation to FIG. 4.

Action 3040: The second network node 111 generates a third URI by appending the address of the second network node 111 as a string to the address representing the NF service producer node 130 comprised in the first URI. In other words, the address of the second network node 110 may be added to the authority part of the first URI. If the first URI comprised the address of the first network node 110 in the authority part, then the address of the first network node 110 will be moved to the path part of the URI when the third URI is generated.

The second network node 111 may further append a generic label to the third URI, in order to fulfill a standardized structure of the address of the second network node 111.

The address of the NF service producer node 130 may be comprised in an API prefix comprised in the URI path of the third URI.

The third URI may be comprised in a location parameter in a HTTP message. This action 3040 is similar to action 407 described in relation to FIG. 4.

Action 3050: The second network node 111 provides the response to the request comprising the third URI to the NF service consuming device 120. The third URI represents the path to the NF service producer node 130 from the NF service consuming device 120. The path to the NF service producer node 130 from the NF service consuming device 120 shall herein be interpreted as e.g. the network nodes that the message has to pass on its way from the NF service consuming device 120 to the NF service producer node 130.

This action 3050 is similar to the action 408 described in relation to FIG. 4.

Action 3060: In some embodiments, the second network node 111 may obtain a request for a service provided by the NF service producer node 130 from the NF service consuming device 120. The request for the service may comprise the third URI.

This action 3060 is similar to action 501 described in relation to FIG. 5.

Action 3070: In some embodiments, the second network node 111 may retrieve the address representing the NF service producer node 130 providing the requested service from the third URI comprised in the obtained request for the service. The address representing the NF service producer node 130 may comprise the address of the first network node 110. The address of the NF service producer node 130 may thus be a path for locating the NF service producer node 130. The address may be retrieved by removing the address of the second network node 111 from the authority part of the third URI, thereby moving the address representing the NF service producer node 130 to the authority part of the URI.

This action 3070 is similar to action 502, described in relation to FIG. 5.

Action 3080: In some embodiments, the second network node 111 may forward the request for the service provided by the NF service producer node 130, to the first network node 110. The service request may be forwarded based on the retrieved address representing the NF service producer node 130. The second network node 111 may manipulate the third URI by removing its own address and may forward the request for the service comprising the manipulated third URI. The manipulated third URI may correspond to the first URI.

This action 3080 is similar to action 503, described in relation to FIG. 5.

Action 3090: In some embodiments, the second network node 111 may receive a response to the request for the service from the first network node 110. The response may comprise an address of a resource created in the NF service producer node 130 in response to the request for the service.

The address of the resource created in the NF service producer node 130 may be comprised in a second URI further comprising the address of the first network node 110.

The address of the resource created in the NF service producer node 130 may also be comprised in an API prefix comprised in the URI path of the second URI, wherein the second URI further may comprise the address of the first network node 110.

The address of the resource may be provided as a FQDN, an IP v4 address or an IP v6 address. The address of the NF service producer node 130 may be comprised in an API prefix comprised in the URI path of the second URI.

The second URI may be comprised in a location parameter in a HTTP message.

This action 3090 is similar to action 508, described in relation to FIG. 5.

Action 3100: In some embodiments, the second network node 111 may generate a fourth URI by appending the address of the second network node 110 to the received address representing the resource created in the NF service producer node 130. The address of the second network node 110 may be appended to the authority part of the fourth URI. The address representing the resource may thus be moved to the path part of the fourth URI.

The second network node 111 may further append a generic label to the fourth URI, in order to fulfill a standardized structure of the address of the second network node 111.

The address of the NF service producer node 130 may be comprised in an API prefix comprised in the fourth URI.

The fourth URI may be comprised in a location parameter in a HTTP message.

This action 3100 is similar to action 509, described in relation to FIG. 5.

Action 3110: In some embodiments, the second network node 111 may provide the response to the request for service to the NF service consuming node 120, wherein the response comprises the fourth URI.

This action 3110 is similar to action 510, described in relation to FIG. 5.

It shall be noted that the first, second, third and fourth URIs do not describe an internal order of the URIs, the terms are rather used to distinguish URIs having different structures and addresses The above steps describe a basic embodiment, additional embodiments will be described in the following.

FIG. 4 discloses an improved solution for inter PLMN discovery according to the embodiments herein. The parenthesis shows security protocol.

- 401. The NF service consumer node 120 in the vPLMN sends a discovery request for a desired service, such as an Nnrf_NFDiscovery_Request operation, to the vNRF.
- 402. The vNRF may determine that the discovery request is for a NF service producer 130 in the hPLMN and may send the discovery request, such as the Nnrf_NF-Discovery_Request, towards the hNRF. Since the NF service consumer 120 and the NF service producer 130 are located in different networks, the discovery request is sent via the gateway node in the vPLMN, such as the second network node 111, communicating with the gateway node in the hPLMN, such as the first network node 110. The first network node 110 may herein also be referred to as a pSEPP and the second network node 111 may herein be referred to as a cSEPP.
- 403. The second network node 111 located in the vPLMN, such as the cSEPP, forwards the request to the first network node 110 located in the hPLMN, such as the pSEPP.
- 404. The first network node 110 retrieves an address of one or more NF service producers 130 matching the discovery query. The address may e.g. be comprised in an NF profile for the NF service producer 130. The address may be retrieved by forwarding the discovery request to the hNRF. The hNRF finds one or more NF service producers 130 matching the discovery query. For simplicity in this example, only one NF service producer 130 is found and its NF profile is sent in the response towards the vNRF. The first network node 110 may receive a response message from the vNRF, comprising a NF profile of the NF service producer 130.
- 405. The first network node 110 may perform topology hiding. According to the known solution the topology hiding was performed by altering the FQDNs of the NF profile(s), and creating a mapping table between the altered $FQDN_{pSEPP}$ and the actual $FQDN_{NFservice}$ of the NF service(s). This may be done by changing the addresses comprised in the NF profile prior to forwarding the response to the cSEPP node. For example for an instance of a service x in the NF profile the service address may be changed (from→to):

$FQDN_{NFservice}$, e.g. $(nf-servicex-1.5gc.mnc1.mcc1.3gpp.org) \rightarrow$ $FQDN_{pSEPP}$, e.g. $(nf-servicex-123.sepp1.mnc1.mcc1.3gpp.org)$ In the known solution, the pSEPP further stores a mapping table, in which the changed address forwarded to the cSEPP is mapped to the corresponding actual service address of the NF service producer. The mapping table has to be continuously updated for every requested service. The mapping table are long lived and thus needs to be stored redundantly. Near real time redundant storage is costly. Also, it is not known for how long data needs to be in the mapping table and thus the logic for purging data from the mapping table will be complex.

According to the embodiments herein however, the topology hiding may be performed by adding the original address, such as the FQDN, of the NF service producer 130 address path of the first network node 110. This may be done by encrypting the original address using a symmetric crypto and append the encrypted address to the apiPrefix. The amended apiPrefix will thereafter be in the format/$hexstring/ xyz, where $hexstring denotes the encrypted address of the NF service provider node 130. The original address may e.g. be encrypted using an Advanced Encryption Standard (AES) crypto with a keyword.

If e.g. the keyword "flintstone" is used and if the original address is nf-servicex-1.5gc.mnc1.mcc1.3gpp.org, then the $hexstring may be e.g. "/b104edab2ad73f113ebe4ae7fd6cebc-4be033e020205792cb1660e8b122feb2848 e70ded4d205fa3c551bc87cfc72451". The amended apiPrefix may thus be e.g. "/b104edab2ad73f113ebe4ae7fd6cebc4be-033e020205792cb1660e8b122feb2848 e70ded4d205fa3c551bc87cfc72451/ xyz".

The first network node 110 may e.g. be pSEPP, and the address may thus simply be psepp.sepp1. mnc1. mcc1.3gpp.org. The created information may be comprised in the elements fqdn and apiPrefix in NFService in the NFProfile. The first network node 110 may create a first URI, wherein a first part of the URI comprises the address of the first network node 110 and a second part of the URI comprises the apiPrefix comprising the address of the NF service producer node 130.

- 406. The first network node 110 sends the response representing the address of the NF service producer node 130 to the second network node 111. The representation may be provided encrypted as a hexstring or unencrypted.
- 407. In order to enable TLS and wildcard certificates, the second network node 111 uses a so called "telescopic" FQDN, as described in TS 23.003 paragraph 28.5.2. In the known solutions this was done by assigning the received addresses in the NF profile, such as all addresses in the NF profile, with a label per address. The second network node 111 would further rewrite the addresses in the NF profile, which would alter the FQDNs to the format "label.$FQDN_{pSEPP}$". The second network node 111 would then have created a mapping table between the label(s) and the $FQDN_{pSEPP}$. For example, the address received for an instance of service x may have been given a label, such as labelXYZ. When a plurality of service instances are available, then each service instance would have been given an individual label, such as:

$FQDN_{pSEPP}$, e.g. nf-servicex-123.sepp1.mnc1.mcc1.3gpp.org → label.$FQDN_{pSEPP}$, e.g. labelXYZ.sepp10.mnc1.mcc2.3gpp.org

The second network node 111 was thus previously required to remember that labelXYZ shall be mapped to nf-servicex-123. sepp1. mnc1. mcc1.3gpp.org, and would have stored the label together with the corresponding service address in a mapping table.

According to the embodiments herein however, instead of the second network node 111, such as the cSEPP, generating the mapping table for labels vs. target addresses, such as FQDNs, the second network node 111 appends the target address, such as the FQDN, of the first network node 110 to the apiPrefix element in the NFService in the NFProfile of the NF service provider 130 and may use a generic label as address. So, if apiPrefix is "/$hexstring/xyz" for an instance of service x when sent from the first network node 110, then the apiPrefix when sent from the second network node 111 may be e.g. "/nf-servicex-1.sepp1. mnc1. mcc1.3gpp.org/$hexstring/xyz, where the first part of the apiPrefix (/nf-servicex-1. sepp1. mnc1. mcc1.3gpp.org) corresponds to the address of the first network node 110. The generic label of all of the service addresses in the NF profile may e.g. be: "label.sepp10. mnctmcc2.3gpp.org". This address may be written into all fqdn:s in all received NF Profiles for all discovery results. The second network node 111 thus creates a third URI path, wherein a first part of the third URI path comprises the address comprises the generic label indicating the second network node 111 and a second part comprising the apiPrefix now comprising both the address of the first network node 110 and the NF service producer node 130.

408. The second network node 111 then provides the discovery response comprising the third URI to the NF service consumer 120, e.g. via the vNRF. The third URI may be comprised in the NF profile of the NF service producer 130.

When the NF service consumer 120 has received the discovery response comprising the address of the one or more NF service producers 130, the NF service consumer 120 may provide a request for the service to the NF service producer 130 in order to setup a session, such as a service session, in the NF service producer 130. FIG. 5 discloses the signalling involved for the service request sent from the NF service consumer 120 to an instance of service x in the NF service producer 130. The instance chosen for performing the service may e.g. have the address as received in step 6 in FIG. 3. In this example the address is label.sepp10. mnc1. mcc2.3gpp.org and the apiPrefix="/nf-servicex-1. sepp1. mnc1. mcc1.3gpp.org/$hexstring/xyz"

501. The NF service consumer node 120 may send a request to a service instance of service x in the NF producer 130. Previously, the request would have comprised the individual labels for each service as provided by the first network node 110.

According to the embodiments herein however, the NF service consumer 120 constructs a resource URI from the received information, which may e.g. be comprised in the NF profile. The information may e.g. be received according to the scheme, fqdn or ipEndPoints and apiPrefix received in NFService in NFprofile, such as: URI=https://label.sepp10. mnc1. mcc2.3gpp.org/psepp.sepp1. mnc1. mcc1.3gp p.org/$hexstring/xyz/service-x/v1/ apiresource The address of the URI, i.e. the first part of the URI, points to the second network node 111 (sepp10. mnc1. mcc2.3gpp.org), so the request is sent to first network node 111 itself. This URI may correspond to the third URI created by the second network node 111 according to the embodiments herein.

502. Instead of retrieving the service address corresponding to the received individual label in the mapping table, as was previously done by the second network node 111, the second network node 111 may know that the first part in the URI, which may also be referred to as at host subcomponent of the URI, is the second network nodes own address and the first part of the URI path is the address of the known target, in this case the address of the first network node 110. The second network node 111 thus rewrites the URI by removing its own address, and thereby retrieves the address representing the NF service producer from the URI (which is the pSEPP). The URI may thereafter be in the following format:

https://psepp.sepp1. mnc1. mcc1.3gpp.org/$hexstring/xyz/service-x/v1/ apiresource The first part of the URI indicates the next interconnection point in the path, which in this example is the first network node 110. Although https is used in this example, other protocols and/or security solutions may also be used between the gateway nodes, such as the first and second network nodes 110, 111. In the URI shown above sepp1. mnc1. mcc1.3gpp.org points to the first network node 110.

503. The second network node 111 forwards the request to the first network node 110 based on the retrieved address.

504. In the previous solution, the first network node 110 would have retrieved the address of the NF service producer 130 from the mapping table based on the received URI from the second network node 111.

According to the embodiments herein however, when the first network node 110 has received the request it translates the part of the URI path to the address of the NF service producer 130, e.g. by removing its own address from the URI. In some embodiments the first network node 110, may take the $hexstring from the path in the URI and may decrypt the $hexstring using its key. Thereafter the URI may be:

https://nf-servicex-1.5gc.mnc1. mcc1.3gpp.org/v1/ apiresource

505. The first network node 110, such as the pSEPP, sends the request to the indicated address, in this case to the NF service producer 130.

506. When the service request has created a resource in the NF service producer 130, then the NF service producer 130 sends a response to the first network node 110 and indicates the resource URI, e.g. in a location parameter in HTTP. If the created resource is located at the IP address 10.0.0.1 and the resource id is resourcid890, the location may be:

location=https://10.0.0.1/ servicex/v1/ resourceid890

507. Previously, the first network node 110 would have altered the FQDN of the created resource and would have created a mapping table between the created FQDN$_{pSEPP}$ and an actual FQDN$_{NFservice}$ of the NF service resource.

According to the embodiments herein however, when the first network node 110 has received the response comprising the address of the resource created in the NF service producer 130, the first network node 110 may generate a second URI by appending its own address in front of the address of the resource generated in the NF service producer 130, to generate an URI according to:

location=http://psepp.sepp1. mnc1. mcc1.3gpp.org/ $hexstring2/ servicex/v1/ resource890

The first network node 110 may further perform topology hiding. This may be done by encrypting the address using its encryption key to generate an encrypted address in form of a second hexstring, herein referred to as $hexstring2. The $hexstring2 may e.g. be a hexadecimal string generated by encrypting "10.0.0.1" using e.g. EAS with a symmetric key, which in the example described herein may be "flintstone". The encrypted address of the resource may be appended in the apiPrefix of the URI.

508. The first network node 110 sends the response to the service request to the second network node 111, comprising the second URI.

509. The second network node 111 receives the response to the service request, comprising the second URI. The second network node 111 generates a fourth URI part, e.g. by performing telescopic FQDN for the received location of the resource, indicated by the second URI. The legacy solution would be to create a label that represents sepp2. mnc1. mcc1.3gpp.org and to store this in a mapping table. According to the embodiments herein however, the address of the second network node 111 is added to the second URI, by appending the address of the second network node 111 in front of the second URI, and adding the second URI to the path part of the URI, in order to generate the fourth URI. The address of the second network node 111 may e.g. be sepp2. mnc1. mcc1.3gpp.org and the location indicated by the fourth URI may thus be:

location=https://label.sepp10. mnc1. mcc2.3gpp.org/ psepp.sepp1. mnc1. mcc1.3gpp.org/$hexsting2/ service-x/ v1/ resource890

510. The second network node 111 then sends the response comprising the fourth URI to the NF service consumer 120.

511. The NF service consumer 120 receives the response comprising the fourth URI and may use the received fourth URI for subsequent request operations towards the created resource in the NF service producer node 130. Any subsequent requests are similar to the actions 1 2 and 3, but using the fourth URI indicative of the resource created in the NF service producer node 130 instead of the third URI indicative of the NF service producer node 130.

Figure 6:
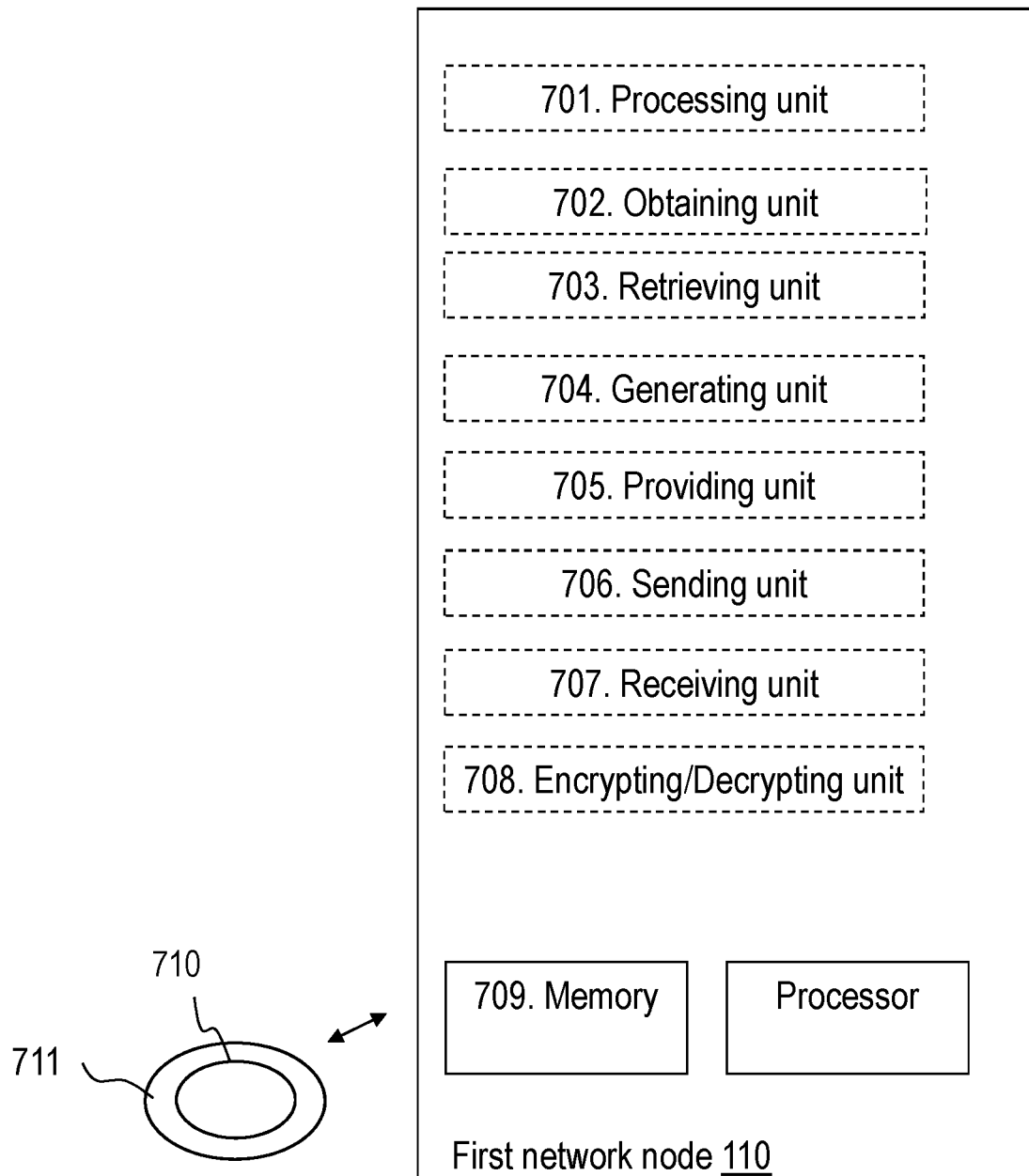
FIG. 6 is a block diagram illustrating some first embodiments of a first network node according to embodiments herein.

FIG. 6 is a block diagram depicting the first network node 110 in the communications network, for handling NF service requests over a roaming interface. The first network node 110 is arranged in a service producer domain of the communications network 100. The first network node 110 may comprise a processing unit 701, such as e.g. one or more processors, an obtaining unit 702, a retrieving unit 703, a generating unit 704, a providing unit 705, a sending unit 706, a receiving unit 707 and an encrypting/decrypting unit 708 as exemplifying hardware units configured to perform the methods described herein.

The first network node 110 is configured to, e.g. by means of the processing unit 701, the obtaining unit 702 and/or the receiving unit 707 being configured to, obtain the discovery request for a service located in the service producer domain of the communications network from the second network node 111 located in a service consumer domain of the communications network 100.

The first network node 110 is configured to, e.g. by means of the processing unit 701, the retrieving unit 703 and/or the receiving unit 707 being configured to, retrieve an address of a NF service producer node 130 providing the requested service, wherein the NF service producer node 130 is located in the service producer domain of the communications network 100. The address of the NF service producer node 130 may be a FQDN, an IP v4 address or an IP v6 address.

The first network node 110 is configured to, e.g. by means of the processing unit 701 and/or the generating unit 704 being configured to, generate the first URI by appending an address of the first network node 110 to the address of the NF service producer node 130. The address of the NF service producer node 130 may be comprised in an API prefix comprised in the first and/or the second URI.

The first network node 110 may be configured to, e.g. by means of the processing unit 701, the providing unit 705 and/or the sending unit 706 being configured to, provide the first URI comprised in a location parameter in a HTTP message.

The first network node 110 is configured to, e.g. by means of the processing unit 701, the providing unit 705 and/or the sending unit 706 being configured to, provide the first URI to the second network node 111.

The first network node 110 is configured to, e.g. by means of the processing unit 701, the providing unit 705 and/or the sending unit 706 being configured to, provide the first URI comprised in a NF profile related to the NF service producer node 130.

The first network node 110 may be configured to, e.g. by means of the processing unit 701, the providing unit 705 and/or the sending unit 706 being configured to, provide the first URI to the second network node 111 in a response message, such as a discovery response message.

The first network node 110 may be configured to, e.g. by means of the processing unit 701, the obtaining unit 702 and/or the receiving unit 707 being configured to, obtain a request for a service located in the service producer domain of the communications network from the second network node 111, wherein the request for the service comprises the first URI.

The first network node 110 may be configured to, e.g. by means of the processing unit 701, and/or the retrieving unit 703 being configured to, retrieve, from the first URI comprised in the obtained request for the service, the address to the NF service producer node 130 providing the requested service.

The first network node 110 may be configured to, e.g. by means of the processing unit 701 and/or the sending unit 706 being configured to, send the request for the service to the NF service producer node 130 indicated by the retrieved address.

The first network node 110 may be configured to, e.g. by means of the processing unit 701, the obtaining unit 702 and/or the receiving unit 707 being configured to, receive a response to the request for the service from the NF service producer node 130, wherein the response comprises an address of a resource created in the NF service producer node 130 in response to the request for the service.

The first network node 110 may be configured to, e.g. by means of the processing unit 701 and/or the generating unit 707 being configured to, generate a second URI by appending the address of the first network node 110 to the received address of the resource created in the NF service producer node 130.

The first network node 110 may be configured to, e.g. by means of the processing unit 701, the providing unit 705 and/or the sending unit 706 being configured to, provide the response to the request for service to the second network node 111, wherein the response comprises the second URI.

The first network node 110 may be configured to, e.g. by means of the processing unit 701, the providing unit 705 and/or the sending unit 706 being configured to, provide the second URI comprised in the NF profile related to the NF service producer node 130.

The first network node 110 may be configured to, e.g. by means of the processing unit 701, the providing unit 705 and/or the sending unit 706 being configured to, provide the second URI comprised in a location parameter in a HTTP message.

The first network node 110 may be configured to, e.g. by means of the processing unit 701 and/or the encrypting/decrypting unit 708 being configured to, encrypt the retrieved address of the NF service producer node 130 and/or encrypt the address of the resource created in the NF service producer node 130 prior to generating the first and/or the second URI.

The first network node 110 may be configured to, e.g. by means of the processing unit 701 and/or the encrypting/decrypting unit 708 being configured to, decrypt the retrieved address of the NF service producer node 130 prior to sending the request to the NF service producer node 130.

The first network node 110 may further comprise a memory 709. The memory may comprise one or more memory units to be used to store data on, such as software, patches, system information (SI), configurations, diagnostic data, performance data and/or applications to perform the methods disclosed herein when being executed, and similar.

Figure 7:
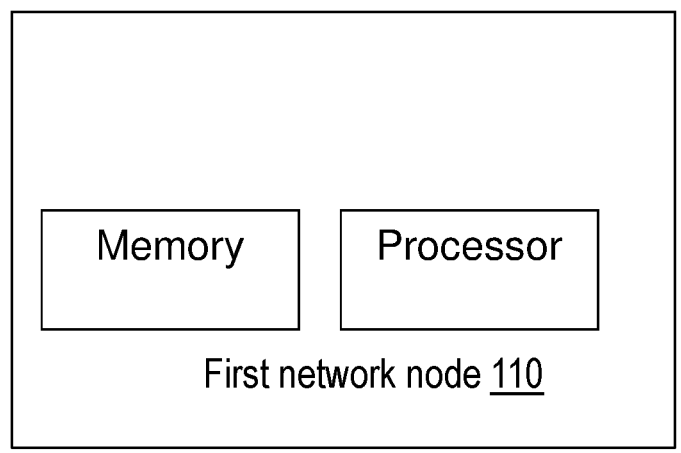
FIG. 7 is a block diagram illustrating some second embodiments of the first network node according to embodiments herein.
Figure 7:
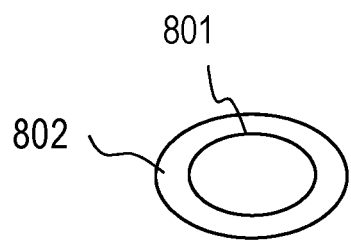

The embodiments herein may be implemented through a respective processor or one or more processors of a processing circuitry in the first network node 110 as depicted in FIG. 7, which processing circuitry is configured to perform the method actions according to FIG. 2 and the embodiments described above for the first network node 110.

The embodiments may be performed by the processor together with respective computer program code for performing the functions and actions of the embodiments herein. The program code mentioned above may also be provided as a computer program product, for instance in the form of a data carrier carrying computer program code for performing the embodiments herein when being loaded into the first network node 110. One such carrier may be in the form of a CD ROM disc. It is however feasible with other data carriers such as e.g. a memory stick. The computer program code may furthermore be provided as pure program code on a server and downloaded to the first network node 110.

The method according to the embodiments described herein for the first network node 110 may be implemented by means of e.g. a computer program product 710, 601 or a computer program, comprising instructions, i.e., software code portions, which, when executed on at least one processor, cause at least one processor to carry out the actions described herein, as performed by the first network node 110. The computer program product 710, 801 may be stored on a computer-readable storage medium 711, 802, e.g. a disc or similar. The computer-readable storage medium 711, 802, having stored thereon the computer program, may comprise instructions which, when executed on at least one processor, cause the at least one processor to carry out the actions described herein, as performed by the first network node 110. In some embodiments, the computer-readable storage medium may be a non-transitory computer-readable storage medium. The computer program may also be comprised on a carrier, wherein the carrier is one of an electronic signal, optical signal, radio signal, or a computer readable storage medium.

Figure 8:
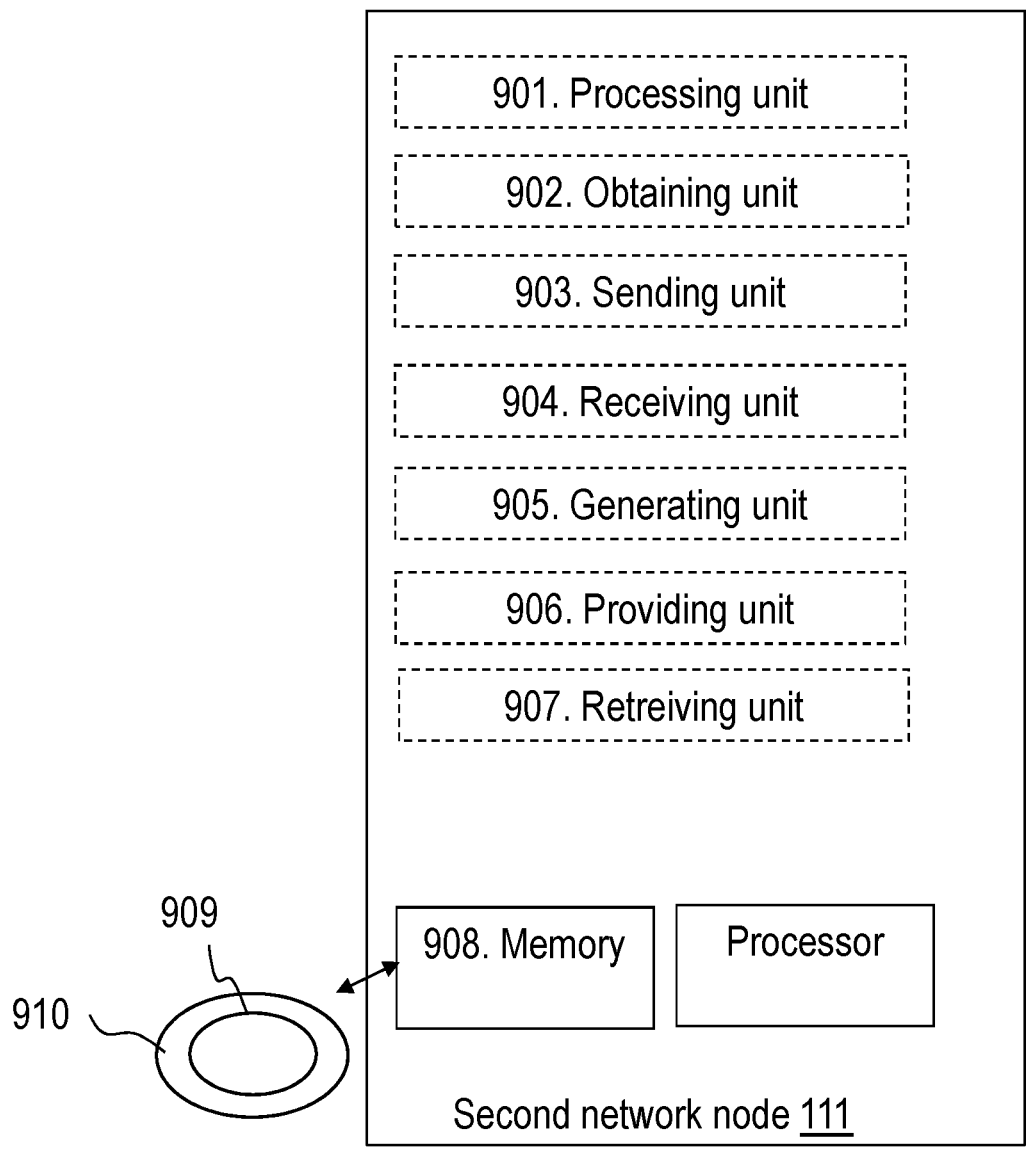
FIG. 8 is a block diagram illustrating some first embodiments of a second network node according to embodiments herein.

FIG. 8 is a block diagram depicting the second network node 111 in the communications network 100, for handling NF service requests over a roaming interface. The second network node 111 is arranged in a service consumer domain of the communications network 100. The second network node 111 may comprise a processing unit 901, such as e.g. one or more processors, an obtaining unit 902, a sending unit 903, a receiving unit 904, a generating unit 905, a providing unit 906, and/or a retrieving unit 907 as exemplifying hardware units configured to perform the methods described herein.

The second network node 111 is configured to, e.g. by means of the processing unit 901, the obtaining unit 902 and/or the receiving unit 904 being configured to, obtain a discovery request from a NF service consuming device 120 for a service located in a service provider domain of the communications network 100.

The second network node 111 is configured to, e.g. by means of the processing unit 901, the sending unit 903 and/or the providing unit 906 being configured to, send the request for the service to the first network node 110 located in a producer domain of the communications network 100.

The second network node 111 is configured to, e.g. by means of the processing unit 901, and/or the receiving unit 904 being configured to, receive, from the first network node 110, a response to the request, wherein the request comprises an address representing an NF service producer node 120. The address representing the NF service producer node 130 may be comprised in a first URI further comprising the address of the first network node 110. The address representing the NF service producer node 130 may further be comprised in an API prefix comprised in a first URI further comprising the address of the first network node 110.

The second network node 111 may be configured to, e.g. by means of the processing unit 901, and/or the receiving unit 904 being configured to, receive the first URI comprised in a location parameter in a HTTP message.

The second network node 111 is configured to, e.g. by means of the processing unit 901, and/or the generating unit 905 being configured to, generate a third URI by appending the address of the second network node 111 as a string to the address representing the NF service producer node 130. The address of the NF service producer node 130 may be comprised in an API prefix comprised in the URI path of the third URI.

The second network node 111 is configured to, e.g. by means of the processing unit 901, the providing unit 906 and/or the sending unit 903 being configured to, provide the response to the request comprising the third URI, to the NF service consuming device 120, wherein the third URI represents the path to the NF service producer node 130 from the NF service consuming device 120.

The second network node 111 may be configured to, e.g. by means of the processing unit 901, the providing unit 906 and/or the sending unit 903 being configured to, provide the third URI comprised in a location parameter in a HTTP message.

The second network node 111 may be configured to, e.g. by means of the processing unit 901, the obtaining unit 902 and/or the receiving unit 904 being configured to, obtain, from the NF service consuming device 120, a request for a service provided by the NF service producer node 130, wherein the request for the service comprises the third URI.

The second network node 111 may be configured to, e.g. by means of the processing unit 901, the retrieving unit 907 and/or the receiving unit 904 being configured to, retrieve the address representing the NF service producer node 130 providing the requested service from the third URI comprised in the obtained request for the service. The address representing the NF service producer node 130 may comprise the address of the first network node 110.

The second network node 111 may be configured to, e.g. by means of the processing unit 901, and/or the sending unit 903 being configured to, send the request for the service provided by the NF service producer node 130, to the first network node 110.

The second network node 111 may be configured to, e.g. by means of the processing unit 901, and/or the receiving unit 904 being configured to, receive, from the first network node 110, a response to the request for the service. The response may comprise an address of a resource created in the NF service producer node 130 in response to the request for the service. The address of the resource created in the NF service producer node 130 may be comprised in a second URI further comprising the address of the first network node 110. The address of the resource created in the NF service producer node 130 may further be comprised in an API prefix comprised in a second URI further comprising the address of the first network node 110.

The second network node 111 may be configured to, e.g. by means of the processing unit 901, and/or the generating unit 905 being configured to, generate a fourth URI by appending the address of the second network node 110 to the received address of the resource created in the NF service producer node 130. The address of the resource created in the NF service producer node 130 may be comprised in an API prefix comprised in the URI path of the fourth URI.

The second network node 111 may be configured to, e.g. by means of the processing unit 901, the providing unit 906 and/or the sending unit 903 being configured to, provide, to the second network node 111, the response to the request for service, wherein the response comprises the fourth URI.

The second network node 111 may be configured to, e.g. by means of the processing unit 901, the providing unit 906 and/or the sending unit 903 being configured to, provide the fourth URI comprised in a location parameter in a HTTP message.

The second network node 111 may be configured to, e.g. by means of the processing unit 901, and/or the generating unit 905 being configured to, append a generic label to the third or fourth URI, in order to fulfill a standardized structure of the address of the second network node 111.

The second network node 111 may be configured to, e.g. by means of the processing unit 901, the providing unit 906, the retrieving unit 907 and/or the receiving unit 903 being configured to, provide, retrieve or receive the addresses as FQDN, an IP v4 address or an IP v6 address.

The second network node 111 may further comprise a memory 908. The memory may comprise one or more memory units to be used to store data on, such as software, patches, system information (SI), configurations, diagnostic data, performance data and/or applications to perform the methods disclosed herein when being executed, and similar.

Figure 3A:
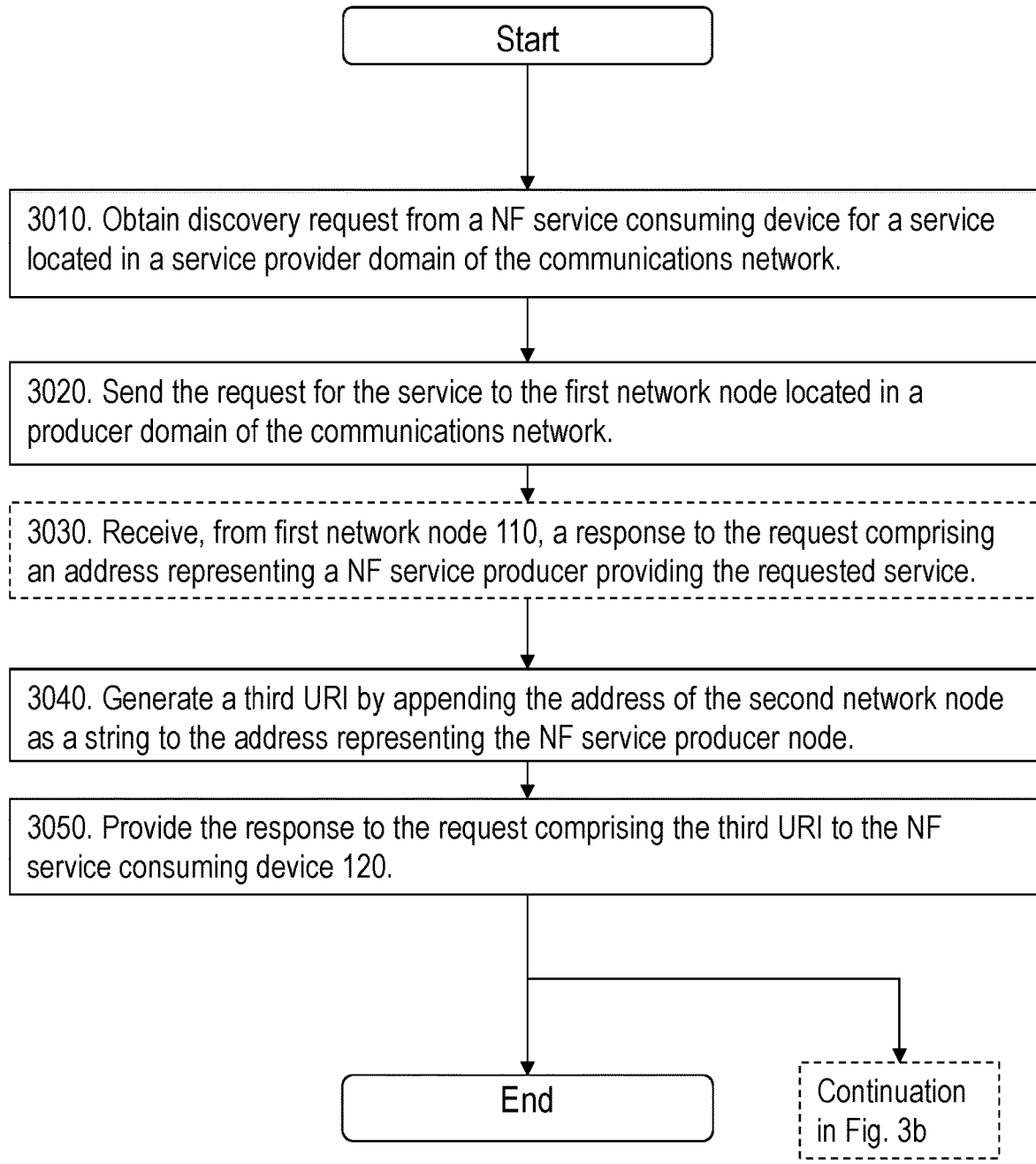
FIG. 3a is a flowchart depicting a method for handling discovery requests performed by a second network node according to embodiments herein.
Figure 3B:
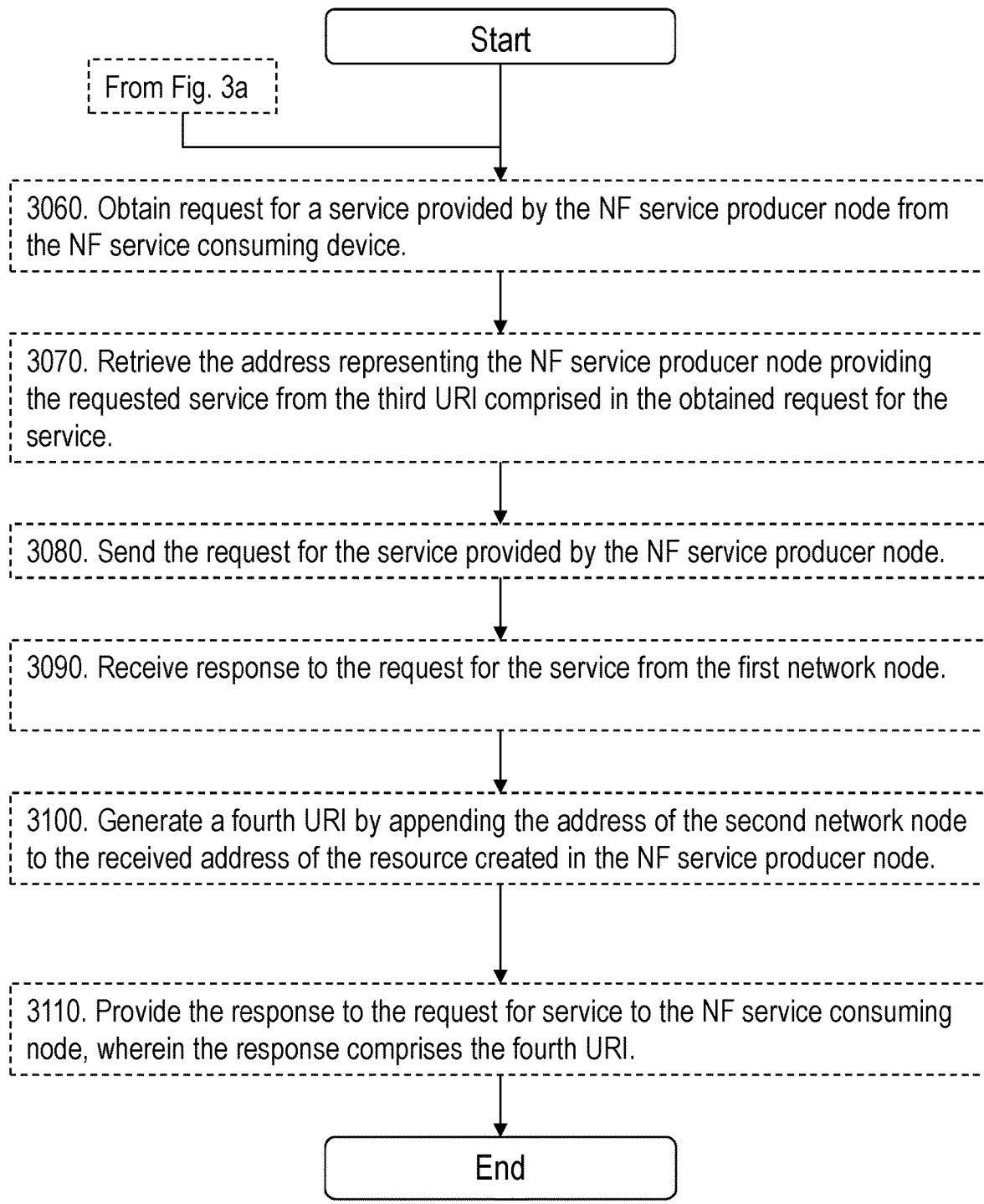
FIG. 3b is a flowchart depicting a method for handling service requests performed by the second network node according to embodiments herein.
Figure 9:
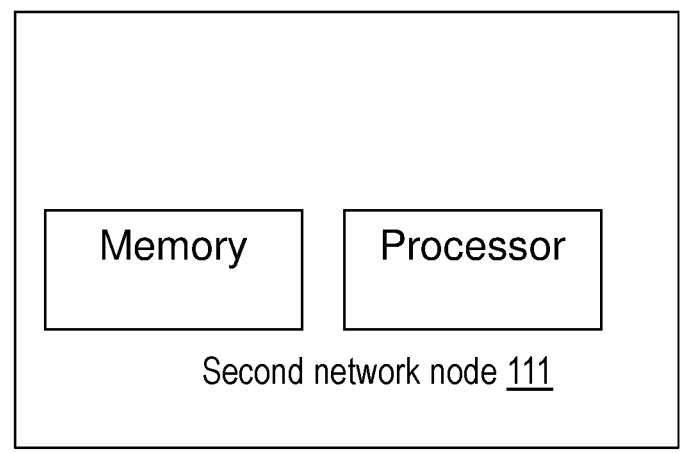
FIG. 9 is a block diagram illustrating some second embodiments of the second network node according to embodiments herein.
Figure 9:
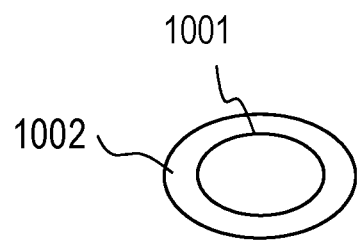

The embodiments herein may be implemented through a respective processor or one or more processors of a processing circuitry in the second network node 111 as depicted in FIG. 9, which processing circuitry is configured to perform the method actions according to FIG. 3 and the embodiments described above for the first network node 111.

The embodiments may be performed by the processor together with respective computer program code for performing the functions and actions of the embodiments herein. The program code mentioned above may also be provided as a computer program product, for instance in the form of a data carrier carrying computer program code for performing the embodiments herein when being loaded into the second network node 111. One such carrier may be in the form of a CD ROM disc. It is however feasible with other data carriers such as e.g. a memory stick. The computer program code may furthermore be provided as pure program code on a server and downloaded to the second network node 111.

The method according to the embodiments described herein for the second network node 111 may be implemented by means of e.g. a computer program product 909, 1001 or a computer program, comprising instructions, i.e., software code portions, which, when executed on at least one processor, cause at least one processor to carry out the actions described herein, as performed by the second network node 111. The computer program product 909, 1001 may be stored on a computer-readable storage medium 910, 1002, e.g. a disc or similar. The computer-readable storage medium 910, 1002, having stored thereon the computer program, may comprise instructions which, when executed on at least one processor, cause the at least one processor to carry out the actions described herein, as performed by the second network node 111. In some embodiments, the computer-readable storage medium may be a non-transitory computer-readable storage medium. The computer program may also be comprised on a carrier, wherein the carrier is one of an electronic signal, optical signal, radio signal, or a computer readable storage medium.

As will be readily understood by those familiar with communications design, that functions means or units may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of network nodes will appreciate the cost, performance, and maintenance trade-offs inherent in these design choices.

When using the word "comprise" or "comprising" it shall be interpreted as non-limiting, i.e. meaning "consist at least of". When using the word "set" herein, it shall be interpreted as meaning "one or more".

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

In the following, tables from 3GPP TS 29.510 will be shown which relate to the NFProfile. Table 6.2.6.2.3-1: Definition of type NFProfile

| Attribute name | Date type | P | Cardinality | Description |
| --- | --- | --- | --- | --- |
| nfInstanceID | NfInstanceId | M | 1 | Unique identity of the NF Instance. |
| nfType | NFType | M | 1 | Type of Network Function |
| nfStatus | NFStatus | M | 1 | Status of the NF Instance |
| plmnList | array(PlmnId) | C | 1 . . . N | PLMN(s) of the Network Function (NOTE 5). This IE shall be present if this information is available for the NF. If not provided, PLMN ID(s) of the PLMN of the NRF are assumed for the NF. |
| sNssais | array(Snssai) | O | 1 . . . N | S-NSSAIs of the Network Function. If not provided, the NF can serve any S-NSSAI. |
| perPlmnSnssaiList | array(PlmnSnssai) | O | 1 . . . N | The per-PLMN list of S-NSSAI(s) supported by the Network Function. |
| nsiList | array(string) | O | 1 . . . N | List of NSIs of the Network Function. If not provided, the NF can serve any NSI. |
| fqdn | Fqdn | C | 0 . . . 1 | FQDN of the Network Function (NOTE 1, NOTE 3) |
| ipv4Addresses | array(Ipv4Addr) | C | 1 . . . N | IPv4 address(es) of the Network Function (NOTE 1) |
| ipv6Addresses | array(Ipv6Addr) | C | 1 . . . N | IPv6 address(es) of the Network Function (NOTE 1) |
| capacity | integer | O | 0 . . . 1 | Static capacity information in the range of 0-65535, expressed as a weight relative to other NF instances of the same type; if capacity is also present in the nfServiceList parameters, those will have precedence over this value. (See NOTE 2) |
| load | integer | O | 0 . . . 1 | Latest known load information of the NF ranged from 0 to 100 in percentage (See NOTE 4) |
| locality | string | O | 0 . . . 1 | Operator defined information about the location of the NF instance (e.g. geographic location, data center) |
| priority | integer | O | 0 . . . 1 | Priority (relative to other NFs of the same type) in the range of 0-65535, to be used for NF selection; lower values indicate a higher priority. If priority is also present in the nfServiceList parameters, those will have precedence over this value. (See NOTE 2) |
| udrInfo | UdrInfo | O | 0 . . . 1 | Specific data for the UDR (ranges of SUPI, . . .) |
| udmInfo | UdmInfo | O | 0 . . . 1 | Specific data for the UDM |
| ausfInfo | AusfInfo | O | 0 . . . 1 | Specific data for the AUSF |
| amfInfo | AmfInfo | O | 0 . . . 1 | Specific data for the AMF (AMF Set ID, . . .) |
| smfInfo | smfInfo | O | 0 . . . 1 | Specific data for the SMF (DNN's, . . .) |
| upfInfo | UpfInfo | O | 0 . . . 1 | Specific data for the UPF (S-NSSAI, DNN, SMF serving area, . . .) |
| pcfInfo | PcfInfo | O | 0 . . . 1 | Specific data for the PCF |
| bsfInfo | BsfInfo | O | 0 . . . 1 | Specific data for the BSF |
| chfInfo | ChfInfo | O | 0 . . . 1 | Specific data for the CHF |
| customInfo | object | O | 0 . . . 1 | Specific data for custom Network Functions |
| recoveryTime | DateTime | O | 0 . . . 1 | Timestamp when the NF was (re)started |
| nfServicePersistence | boolean | O | 0 . . . 1 | If present, and set to true, it indicates that the different service instances of a same NF Service in the NF instance, supporting a same API version, are capable to persist their resource state in shared storage and therefore these resources are available after a new NF service instance supporting the same API version is selected by a NF Service Consumer (see 3GPP TS 23.527 [27]). Otherwise, it indicates that the NF Service Instances of a same NF Service are not capable to share resource state inside the NF Instance. |

-continued

| Attribute name | Date type | P | Cardinality | Description |
|---|---|---|---|---|
| nfServices | array(NFService) | O | 1 . . . N | List of NF Service Instances |
| defaultNotificationSubscriptions | array(DefaultNotificationSubscription) | O | 1 . . . N | Notification endpoints for different notification types. (NOTE 6) |

(NOTE 1):
At least one of the addressing parameters (fqdn, ipv4address or ipv6adress) shall be included in the NF Profile. See NOTE 1 of Table 6.2.6.2.4-1 for the use of these parameters.
(NOTE 2):
The capacity and priority parameters, if present, are used for NF selection and load balancing. The priority and capacity attributes shall be used for NF selection in the same way that priority and weight are used for server selection as defined in IETF RFC 2782 [23].
(NOTE 3):
If the requester-plmn in the query parameter is different from the PLMN of the discovered NF, then the fqdn attribute value shall contain the interPlmnFqdn value registered by the NF during NF registration (see subclause 6.1.6.2.2). The requester-plmn is different from the PLMN of the discovered NF if it belongs to none of the PLMN ID(s) configured for the PLMN of the NRF.
(NOTE 4):
The usage of the load parameter by the NF service consumer is implementation specific, e.g. be used for NF selection and load balancing, together with other parameters.
(NOTE 5):
An NF may register multiple PLMN IDs in its profile within a PLMN comprising multiple PLMN IDs. If so, all the attributes of the NF Profile shall apply to each PLMN ID registered in the plmnList. As an exception, attributes including a PLMN ID, e.g. IMSI-based SUPI ranges, TAIs and GUAMIs, are specific to one PLMN ID and the NF may register in its profile multiple occurrences of such attributes for different PLMN IDs (e.g. the UDM may register in its profile SUPI ranges for different PLMN IDs).
(NOTE 6):
If notification endpoints are present both in the profile of the NF instance (NFProfile) and in some of its NF Services (NFService) for a same notification type, the notification endpoint(s) of the NF Services shall be used for this notification type.

TABLE 6.2.6.2.4-1

Definition of type NFService
6.2.6.2.4 Type: NFService

| Attribute name | Data type | P | Cardinality | Description |
|---|---|---|---|---|
| serviceInstanceID | string | M | 1 | Unique ID of the service instance within a given NF Instance |
| serviceName | ServiceName | M | 1 | Name of the service instance (e.g. "udm-sdm") |
| versions | array(NFServiceVersion) | M | 1 . . . N | The API versions supported by the NF Service and if available, the corresponding retirement date of the NF Service. The different array elements shall have distinct unique values for "apiVersionInUri", and consequently, the values of "apiFullVersion" shall have a unique first digit version number. |
| scheme | UriScheme | M | 1 | URI scheme (e.g. "http", "https") |
| nfServiceStatus | NFServiceStatus | M | 1 | Status of the NF Service Instance |
| fqdn | string | O | 0 . . . 1 | FQDN of the NF Service Instance (see NOTE 1, NOTE 3) |
| ipEndPoints | array(IpEndPoint) | O | 1 . . . N | IP address(es) and port information of the Network Function (including IPv4 and/or IPv6 address) where the service is listening for incoming service requests (see NOTE 1, NOTE 5) |
| apiPrefix | string | O | 0 . . . 1 | Optional path segment(s) used to construct the {apiRoot} variable of the different API URIs, as described in 3GPP TS 29.501 [5], subclause 4.4.1 (optional deployment-specific string that starts with a "/" character) |
| defaultNotificationSubscriptions | array(DefaultNotificationSubscription) | O | 1 . . . N | Notification endpoints for different notification types. |
| capacity | integer | O | 0 . . . 1 | Static capacity information in the range of 0-65535, expressed as a weight relative to other services of the same type. (See NOTE 2) |
| load | integer | O | 0 . . . 1 | Latest known load information of the NF Service, ranged from 0 to 100 in percentage. (See NOTE 4) |
| priority | integer | O | 0 . . . 1 | Priority (relative to other services of the same type) in the range of 0-65535, to be used for NF Service selection; lower values indicate a higher priority. (See NOTE 2) |

TABLE 6.2.6.2.4-1-continued

Definition of type NFService
6.2.6.2.4 Type: NFService

| Attribute name | Data type | P | Cardinality | Description |
| --- | --- | --- | --- | --- |
| recoveryTime | DateTime | O | 0 . . . 1 | Timestamp when the NF service was (re)started |
| chfServiceInfo | ChfServiceInfo | O | 0 . . . 1 | Specific data for the CHF service instance |
| supportedFeatures | SupportedFeatures | O | 0 . . . 1 | Supported Features of the NF Service instance |

(NOTE 1):
The NF Service Consumer shall construct the API URIs of the service using:
for intra-PLMN signalling: the FQDN and IP addresses related attributes present in the NF Service Profile, if any, otherwise the FQDN and IP addresses related attributes present in the NF Profile.
for inter-PLMN signalling: the FQDN present in the NF Service Profile, if any, otherwise the FQDN present in the NF Profile (see NOTE 3).
(NOTE 2):
The capacity and priority parameters, if present, are used for service selection and load balancing. The priority and capacity attributes shall be used for NF selection in the same way that priority and weight are used for server selection as defined in IETF RFC 2782 [23].
(NOTE 3):
If the requester-plmn in the query parameter is different from the PLMN of the discovered NF Service, then the fqdn attribute value, if included shall contain the interPlmnFqdn value registered by the NF Service during NF registration (see subclause 6.1.6.2.3). The requester-plmn is different from the PLMN of the discovered NF Service if it belongs to none of the PLMN ID(s) configured for the PLMN of the NRF.
(NOTE 4):
The usage of the load parameter by the NF service consumer is implementation specific, e.g. be used for NF service selection and load balancing, together with other parameters.
(NOTE 5):
If the ipEndPoints attribute is absent in the NF Service and NF Profile, the NF service consumer shall use the fqdn attribute value for DNS query and if the NF service consumer does not receive a port number during the DNS query it shall use the default HTTP port number, i.e. TCP port 80 for "http" URIs or TCP port 443 for "https" URIs as specified in IETF RFC 7540 [9] when invoking the service.

The invention claimed is:

1. A method performed by a first network node in a communications network, for handling Network Function (NF) service requests over a roaming interface, the first network node being arranged in a service producer domain of the communications network, wherein the method comprises:
obtaining, from a second network node located in a service consumer domain of the communications network, a discovery request for a service located in the service producer domain of the communications network;
retrieving an address of a NF service producer node providing the requested service, wherein the NF service producer node is located in the service producer domain of the communications network;
generating a first Uniform Resource Identifier (URI) by appending an address of the first network node to an URI string of the NF service producer node; and
providing, to the second network node, the first URI.

2. The method according to claim 1, wherein the method further comprises:
obtaining, from the second network node, a request for a service located in the service producer domain of the communications network, wherein the request for the service comprises the first URI;
retrieving, from the first URI comprised in the obtained request for the service, the address to the NF service producer node providing the requested service; and
sending the request for the service to the NF service producer node indicated by the retrieved address.

3. The method according to claim 2, wherein the method further comprises:
receiving, from the NF service producer node, a response to the request for the service, wherein the response comprises a URI string representing a resource created in the NF service producer node in response to the request for the service;
generating a second URI by appending the address of the first network node to the received URI string representing the resource created in the NF service producer node; and
providing, to the second network node, the response to the request for service, wherein the response comprises the second URI.

4. The method according to claim 3, wherein the method further comprises:
encrypting the retrieved address of the NF service producer node, encrypting the address of the resource created in the NF service producer node, or encrypting both, prior to generating the first URI, the second URI, or both URIs.

5. The method according to claim 4, wherein the method further comprises:
decrypting the retrieved address of the NF service producer node prior to sending the request to the NF service producer node.

6. A method performed by a second network node in a communications network, for handling Network Function (NF) service requests over a roaming interface, the second network node being arranged in a service consumer domain of the communications network, wherein the method comprises:
obtaining a discovery request from a NF service consuming device for a service located in a service provider domain of the communications network;
sending, to a first network node located in a producer domain of the communications network, the request for the service;
receiving, from the first network node, a response to the request, wherein the response comprises a Uniform Resource Identifier (URI) representing a NF service producer node;
generating a third URI by appending an address of the second network node as a string to an URI string of the received URI representing the NF service producer node; and
providing, to the NF service consuming device, the response to the request comprising the third URI.

7. The method according to claim 6, wherein the method further comprises:
obtaining, from the NF service consuming device, a request for a service provided by the NF service producer node, wherein the request for the service comprises the third URI;

retrieving, from the third URI comprised in the obtained request for the service, the address representing the NF service producer node providing the requested service, wherein the third URI representing the NF service producer node comprises the address of the first network node; and forwarding, to the first network node, the request for the service provided by the NF service producer node, based on the retrieved address representing the NF service producer node.

8. The method according to claim 7, wherein the method further comprises:

receiving, from the first network node, a response to the request for the service, wherein the response comprises a URI of a resource created in the NF service producer node in response to the request for the service;

generating a fourth URI by appending the address of the second network node to the received URI string of the resource created in the NF service producer node; and providing, to the NF service consuming node, the response to the request for service, wherein the response comprises the fourth URI.

9. The method according to claim 6, wherein the address representing the NF service producer node is comprised in a first URI further comprising the address of the first network node.

10. The method according to claim 6, wherein the address representing the NF service producer node is comprised in an Application Programming Interface (API) prefix comprised in a NF profile.

11. A first network node in a communications network, for handling Network Function (NF) service requests over a roaming interface, the first network node being arranged in a service producer domain of the communications network, wherein the first network node comprises:

at least one processor; and a memory comprising instructions which, when executed by the at least one processor, cause the first network node to:

obtain, from a second network node located in a service consumer domain of the communications network, a discovery request for a service located in the service producer domain of the communications network;

retrieve an address of a NF service producer node providing the requested service, wherein the NF service producer node is located in the service producer domain of the communications network;

generate a first Uniform Resource Identifier (URI) by appending an address of the first network node to the address of the NF service producer node; and provide, to the second network node, the first URI.

12. The first network node according to claim 11, wherein the first network node is further to:

obtain, from the second network node, a request for a service located in the service producer domain of the communications network, wherein the request for the service comprises the first URI;

retrieve, from the first URI comprised in the obtained request for the service, the address to the NF service producer node providing the requested service; and send the request for the service to the NF service producer node indicated by the retrieved address.

13. The first network node according to claim 12, wherein the first network node is further to:

receive, from the NF service producer node, a response to the request for the service, wherein the response comprises an address of a resource created in the NF service producer node in response to the request for the service;

generate a second URI by appending the address of the first network node to the received address of the resource created in the NF service producer node; and provide, to the second network node, the response to the request for service, wherein the response comprises the second URI.

14. The first network node according to claim 13, wherein the first network node is further to:

encrypt the retrieved address of the NF service producer node, encrypt the address of the resource created in the NF service producer node, or encrypt both, prior to generating the first URI, the second URI, or both URIs.

15. The first network node according to claim 14, wherein the first network node is further to:

decrypt the retrieved address of the NF service producer node prior to sending the request to the NF service producer node.

16. The first network node according to claim 11, wherein the address of the NF service producer node is a Fully Qualified Domain Name (FQDN), an Internet Protocol (IP) v4 address or an IP v6 address.

17. The first network node according to claim 13, wherein the address of the NF service producer node is comprised in an Application Programming Interface(API) prefix comprised in the first URI, the second URI, or both URIs.

18. The first network node according to claim 13, wherein the first URI, the second URI, or both URIs, is comprised in a NF profile related to the NF service producer node.

19. The first network node according to claim 13, wherein the first URI, the second URI, or both URIs, is comprised in a location parameter in a Hypertext Transfer Protocol (HTTP) message.

20. A second network node in a communications network, for handling Network Function (NF) service requests over a roaming interface, the second network node being arranged in a service consumer domain of the communications network, wherein the second network node comprises:

at least one processor; and a memory comprising instructions which, when executed by the at least one processor, cause the second network node to:

obtain a discovery request from a NF service consuming device for a service located in a service provider domain of the communications network;

send, to a first network node located in a producer domain of the communications network, the request for the service;

receive, from the first network node, a response to the request comprising an address representing an NF service producer node;

generate a third Uniform Resource Identifier (URI) by appending the address of the second network node as a string to the address representing the NF service producer node; and provide, to the NF service consuming device, the response to the request comprising the third URI, wherein the third URI represents a path to the NF service producer node from the NF service consuming device.

21. The second network node according to claim 20, wherein the second network node further is to:

obtain, from the NF service consuming device, a request for a service provided by the NF service producer node, wherein the request for the service comprises the third URI;

retrieve, from the third URI comprised in the obtained request for the service, the address representing the NF service producer node providing the requested service, wherein the address representing the NF service producer node comprises the address of the first network node; and send, to the first network node, the request for the service provided by the NF service producer node.

22. The second network node according to claim 21, wherein the second network node further is to:

receive, from the first network node, a response to the request for the service, wherein the response comprises an address of a resource created in the NF service producer node in response to the request for the service;

generate a fourth URI by appending the address of the second network node to the received address of the resource created in the NF service producer node; and provide, to the second network node, the response to the request for service, wherein the response comprises the fourth URI.

23. The second network node according to claim 22, wherein the address of the resource created in the NF service producer node is comprised in a second URI further comprising the address of the first network node.

24. The second network node according to claim 20, wherein the address representing the NF service producer node is comprised in a first URI further comprising the address of the first network node.

25. The second network node according to claim 20, wherein the address representing the NF service producer node is comprised in an Application Programming Interface (API) prefix comprised in a first URI further comprising the address of the first network node.

* * * * *